United States Patent
Kunita et al.

(10) Patent No.: US 12,148,964 B2
(45) Date of Patent: Nov. 19, 2024

(54) COMPOSITE POLYMER ELECTROLYTE MEMBRANE, ELECTROLYTE MEMBRANE WITH CATALYST LAYER, MEMBRANE-ELECTRODE ASSEMBLY, AND SOLID POLYMER FUEL CELL

(71) Applicant: TORAY INDUSTRIES, INC., Tokyo (JP)

(72) Inventors: Tomoyuki Kunita, Otsu (JP); Kenta Minamibayashi, Otsu (JP); Daisuke Ogata, Otsu (JP); Daisuke Izuhara, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 479 days.

(21) Appl. No.: 17/642,817

(22) PCT Filed: Sep. 11, 2020

(86) PCT No.: PCT/JP2020/034419
§ 371 (c)(1),
(2) Date: Mar. 14, 2022

(87) PCT Pub. No.: WO2021/054252
PCT Pub. Date: Mar. 25, 2021

(65) Prior Publication Data
US 2022/0407101 A1  Dec. 22, 2022

(30) Foreign Application Priority Data
Sep. 20, 2019  (JP) .................. 2019-171866

(51) Int. Cl.
*H01M 8/1067* (2016.01)
*H01M 8/10* (2016.01)
*H01M 8/1004* (2016.01)
*H01M 8/106* (2016.01)
*H01M 8/1062* (2016.01)

(52) U.S. Cl.
CPC ....... *H01M 8/1067* (2013.01); *H01M 8/1004* (2013.01); *H01M 8/106* (2013.01); *H01M 8/1062* (2013.01); *H01M 2008/1095* (2013.01)

(58) Field of Classification Search
CPC .. H01M 8/1067; H01M 8/1004; H01M 8/106; H01M 8/1062; H01M 2008/1095; H01M 8/1032; H01M 4/881; H01M 8/1027; H01M 8/102; H01M 8/1051; Y02E 60/50; H01B 1/122; H01B 1/128
See application file for complete search history.

(56) References Cited

U.S. PATENT DOCUMENTS

| | | | |
|---|---|---|---|
| 2011/0008708 A1 | 1/2011 | Akita et al. | |
| 2011/0318669 A1 | 12/2011 | Miyake et al. | |
| 2013/0253157 A1 | 9/2013 | Takami et al. | |

FOREIGN PATENT DOCUMENTS

| | | |
|---|---|---|
| EP | 3 206 246 A1 | 8/2017 |
| EP | 3 419 093 A1 | 12/2018 |
| EP | 3 780 204 A1 | 2/2021 |
| JP | 2008-288193 A | 11/2008 |
| JP | 2013-62240 A | 4/2013 |
| WO | WO 2010/101195 A1 | 9/2010 |

OTHER PUBLICATIONS

Extended European Search Report for European Application No. 20864384.1, dated Aug. 24, 2023.
International Search Report, issued in PCT/JP2020/034419, dated Nov. 17, 2020.
Written Opinion of the International Searching Authority, issued in PCT/JP2020/034419, dated Nov. 17, 2020.

*Primary Examiner* — Helen Oi K Conley
(74) *Attorney, Agent, or Firm* — Birch, Stewart, Kolasch & Birch, LLP

(57) ABSTRACT

A composite polymer electrolyte membrane including a polymer electrolyte and a porous substrate, and having a dry tensile modulus of 100 N/cm or more per width and a wet tensile modulus of 35 N/cm or more per width. Enhancing the mechanical characteristics of the electrolyte membrane results in providing an electrolyte membrane that achieves good dry-wet cycle durability.

18 Claims, No Drawings

COMPOSITE POLYMER ELECTROLYTE MEMBRANE, ELECTROLYTE MEMBRANE WITH CATALYST LAYER, MEMBRANE-ELECTRODE ASSEMBLY, AND SOLID POLYMER FUEL CELL

TECHNICAL FIELD

The present invention relates to a composite polymer electrolyte membrane, a catalyst coated composite polymer electrolyte membrane including the composite polymer electrolyte membrane and catalyst layers, wherein the composite polymer electrolyte membrane is sandwiched between the catalyst layers, a membrane electrode assembly containing the composite polymer electrolyte membrane, and a polymer electrolyte fuel cell containing the composite polymer electrolyte membrane.

BACKGROUND ART

Fuel cells are a kind of power generator from which electric energy is extracted by electrochemical oxidation of a fuel such as hydrogen or methanol, and have recently attracted attention as a clean energy source. Above all, polymer electrolyte fuel cells have a low standard operating temperature of around 100° C. and a high energy density. Therefore, polymer electrolyte fuel cells are expected to be widely applied to relatively small distributed power generation facilities as well as to power generators for mobile objects such as automobiles and ships. Polymer electrolyte fuel cells have also attracted attention as a power source for small mobile devices and portable devices, and are expected to be installed in mobile phones, personal computers, and the like in place of secondary batteries such as nickel-hydrogen batteries and lithium-ion batteries.

A fuel cell usually includes, as a unit, a cell including a membrane electrode assembly (hereinafter referred to as MEA) sandwiched between separators. In the MEA, a catalyst layer is arranged on either side of an electrolyte membrane, and a gas diffusion layer is further arranged on either side of the resulting laminate. In the MEA, the catalyst layer and the gas diffusion layer that are arranged on either side of the electrolyte membrane form a pair of electrode layers, and one of the electrode layers is an anode electrode and the other is a cathode electrode. A fuel gas containing hydrogen comes into contact with the anode electrode, and the air comes into contact with the cathode electrode, whereby electric power is generated by an electrochemical reaction. The electrolyte membrane is mainly made from a polymer electrolyte material. The polymer electrolyte material is also used as a binder for the catalyst layer.

Conventionally, "Nafion" (registered trademark) (manufactured by The Chemours Company), which is a fluoropolymer electrolyte, has been widely used as a polymer electrolyte material. "Nafion" (registered trademark) exhibits high proton conductivity under low humidification through a proton conduction channel formed by a cluster structure. Meanwhile, "Nafion" (registered trademark) has problems that it is very expensive because of being produced through multi-step synthesis, and that the above-mentioned cluster structure causes significant fuel crossover. Further, fuel cells are repeatedly subjected to the dry-wet cycle under the operating conditions, and in particular, the electrolyte membrane repeatedly swells and shrinks. In such a process, since the electrolyte membrane is bound by the separators and the like, the electrolyte membrane may be wrinkled or slackened, or broken due to local stress concentration, and may lose the mechanical strength or dry-wet cycle durability. Further, it has been pointed out that "Nafion" (registered trademark) cannot be used at high temperature because of the low softening point. Moreover, problems such as disposal after use and the difficulty of material recycling have also been pointed out. In order to overcome such problems, an inexpensive hydrocarbons electrolyte membrane that can be used in place of "Nafion" (registered trademark) and that is excellent in membrane characteristics has been actively developed in recent years.

In the case of such a polymer electrolyte fuel cell, it is important to enhance the mechanical characteristics and, moreover, dry-wet cycle durability of the electrolyte membrane in order to enhance the long-term durability of the fuel cell. Hitherto, there has been a problem in that the electrolyte membrane does not have sufficient dry-wet cycle durability, and thus, that the electrolyte membrane is broken owing to wrinkling or slackening during the dry-wet cycle, as above-mentioned, and loses dry-wet cycle durability. In view of this, what is proposed is to provide a composite electrolyte membrane in which a polymer electrolyte is combined with a porous substrate such as a nanofiber or a microporous film for the purpose of enhancing the mechanical characteristics and dry-wet cycle durability of the electrolyte membrane.

Patent Document 1 describes a membrane that is a composite made of a hydrocarbon polymer electrolyte and a nanofiber (hereinafter referred to as NF) nonwoven fabric of polybenzimidazole (hereinafter referred to as PBI) to suppress the swell. Patent Document 2 describes a membrane that is a composite made of a fluorinated electrolyte and an NF nonwoven fabric of soluble PBI to suppress the swell. Patent Document 3 describes a membrane that is a composite made of sulfonated polyimide and an NF nonwoven fabric of acid-penetrated PBI to enhance the proton conductivity and mechanical characteristics. Patent Document 4 describes a membrane that is a composite made of sulfonated polyarylene and stretched porous polytetrafluoroethylene (ePTFE) to enhance the mechanical characteristics.

PRIOR ART DOCUMENTS

Patent Documents

Patent Document 1: International Patent Application Publication No. WO2017/141878
Patent Document 2: Japanese Patent Laid-open Publication No. 2017-532716
Patent Document 3: Japanese Patent Laid-open Publication No. 2015-28850
Patent Document 4: Japanese Patent Laid-open Publication No. 2005-166557

SUMMARY OF THE INVENTION

Problems to be Solved by the Invention

According to Patent Document 1, however, the ratio of the thickness of the NF nonwoven fabric of PBI to the thickness of the composite polymer electrolyte membrane is small, the mechanical characteristics of the membrane in a wet state are not sufficient, and thus, the dry-wet cycle durability cannot necessarily be said to be excellent. According to Patent Document 2, the NF nonwoven fabric of solvent-soluble PBI is spun and made into a composite without being dried, and in the membrane-forming step, the NF nonwoven fabric of PBI is swollen, deformed, and/or softened owing to the solvent, thus posing a problem in that the mechanical characteristics of the membrane in a wet state are insufficient, and that the dry-wet cycle durability is insufficient. Additionally, according to Patent Document 3, allowing acid to penetrate into the nanofiber nonwoven fabric causes the membrane to have higher water absorption, thus posing a problem in that the mechanical characteristics of the membrane in a wet state are insufficient, and that the dry-wet cycle durability is insufficient. According to Patent Document 4, the membrane contains neither ePTFE, which is a hydrophobic lipophobic compound, nor a fluorine atom, and is formed such that an N-methylpyrrolidone (NMP) solution of polyarylene, which originally has an extremely low affinity with ePTFE, is penetrated into the membrane. Accordingly, the membrane results in actually having a large number of pores, thus posing a problem in that the mechanical characteristics of the membrane particularly in a wet state are insufficient, and that the dry-wet cycle durability is insufficient.

In view of such a background, the present invention is intended to provide an electrolyte membrane that is a composite of a polymer electrolyte and a porous substrate, has good mechanical characteristics both in a dry state and in a wet state, and makes it possible to enhance the dry-wet cycle durability of the fuel cell.

Solutions to the Problems

To solve the above-mentioned problems, a composite polymer electrolyte membrane according to the present invention has the following constitution. That is, a composite polymer electrolyte membrane comprising a polymer electrolyte and a porous substrate, and having a dry tensile modulus of 100 N/cm or more per width and a wet tensile modulus of 35 N/cm or more per width.

A catalyst coated electrolyte membrane according to the present invention has the following constitution. That is, a catalyst coated composite polymer electrolyte membrane comprising: the composite polymer electrolyte membrane; and catalyst layers, wherein the composite polymer electrolyte membrane is sandwiched between the catalyst layers.

A membrane electrode assembly according to the present invention has the following constitution. That is, a membrane electrode assembly containing the above-mentioned composite polymer electrolyte membrane.

A polymer electrolyte fuel cell according to the present invention has the following constitution. That is, a polymer electrolyte fuel cell containing the above-mentioned composite polymer electrolyte membrane.

The composite polymer electrolyte membrane according to the present invention preferably has a wet tensile modulus of 400 MPa or more per cross-sectional area.

The composite polymer electrolyte membrane according to the present invention preferably has a wet tensile modulus/dry tensile modulus ratio of 0.3 or more.

The composite polymer electrolyte membrane according to the present invention preferably has a wet tensile breaking elongation of 60% or more.

The composite polymer electrolyte membrane according to the present invention preferably has a wet tensile breaking strength of 5 N/cm or more.

In the composite polymer electrolyte membrane according to the present invention, the porous substrate is preferably a fluorinated porous substrate.

In the composite polymer electrolyte membrane according to the present invention, the oxygen atom content of the porous substrate is 10 mass % or less.

In the composite polymer electrolyte membrane according to the present invention, the polymer electrolyte is preferably an ionic group-containing hydrocarbon polymer.

The composite polymer electrolyte membrane according to the present invention preferably further contains a nonionic fluorinated surfactant.

In the composite polymer electrolyte membrane containing a nonionic fluorinated surfactant according to the present invention, the nonionic fluorinated surfactant is preferably a compound having a fluorine-containing group including a fluorinated alkyl group, a fluorinated alkenyl group, or a fluorinated aryl group, and a nonionic lyophilic group.

In the composite polymer electrolyte membrane according to the present invention, the porous substrate is preferably an aromatic hydrocarbon porous substrate.

In the composite polymer electrolyte membrane according to the present invention, the porous substrate is preferably a polyazole-based porous substrate.

In the composite polymer electrolyte membrane according to the present invention, the porous substrate preferably includes polybenzimidazole.

The composite polymer electrolyte membrane according to the present invention preferably has a haze value of 20% or more and 45% or less when transmitting a light beam in the thickness direction.

The composite polymer electrolyte membrane according to the present invention preferably has as a diffuse transmittance of 20% or more and 40% or less when transmitting a light beam in the thickness direction.

Effects of the Invention

An electrolyte membrane according to the present invention has good mechanical characteristics either in a dry state or in a wet state, and makes it possible to enhance the dry-wet cycle durability of the fuel cell.

EMBODIMENTS OF THE INVENTION

In the following, the present invention will be described in detail. Hereinafter, the wording "to" in a numerical range represents that the range includes numerical values at both ends thereof.

<Electrolyte Membrane>

An electrolyte membrane according to the present invention is an electrolyte membrane having a composite layer which is a composite made of a polymer electrolyte and a porous substrate, and at the same time, is an electrolyte membrane having mechanical characteristics including a dry tensile modulus of 100 N/cm or more per width and a wet tensile modulus of 35 N/cm or more per width. In a fuel cell or the like, it is usual that two separators are compressed using screws or the like so as to closely attach the constituent members to each other, decrease the resistance, and enhance the power generation performance. However, in cases where the dry tensile modulus is less than 100 N/cm per width, the electrolyte membrane is more likely to be deformed and perforated by an external force applied by the catalyst layer, the gas diffusion layer, and the like, thus resulting in having insufficient dry-wet cycle durability. In addition, a wet tensile modulus of less than 35 N/cm per width makes it impossible to suppress the softening of the electrolyte membrane in a wet state, thus causing the fuel cell to have insufficient dry-wet cycle durability. As below-mentioned, the porous substrate preferably contains a hydrophobic compound as a main component, and is more preferably composed of a fluoropolymer compound having excellent water resistance and chemical resistance. In addition, it is possible to suitably use a porous substrate composed of an aromatic hydrocarbon polymer compound having hydrophobicity and in addition, excellent elastic modulus and breaking strength. Using a porous substrate containing a hydrophobic compound as a main component makes it more likely to suppress the softening of the electrolyte membrane in a wet state, and enhance the wet tensile modulus. Using such a polymer electrolyte membrane having excellent mechanical characteristics makes it possible to enhance the dry-wet cycle durability of the fuel cell. In the present invention, the dry tensile modulus per width and the wet tensile modulus per width are calculated using the methods described in (15) and (16) respectively in the section of EXAMPLES.

The electrolyte membrane preferably has a wet tensile modulus of 40 N/cm or more per width, more preferably 45 N/cm or more, still more preferably 48 N/cm or more. Having a wet tensile modulus of 40 N/cm or more per width makes it possible to suppress the softening of the electrolyte membrane in a wet state, and further enhance the dry-wet cycle durability of the fuel cell.

The wet tensile modulus of the electrolyte membrane is preferably 400 MPa or more per cross-sectional area, more preferably 450 MPa or more, still more preferably 500 MPa or more. Having a wet tensile modulus of 400 MPa or more per cross-sectional area not only makes it possible to suppress the softening of the electrolyte membrane in a wet state, and further enhance the dry-wet cycle durability of the fuel cell, but also makes it possible to form the electrolyte membrane into a thin film still maintaining high mechanical characteristics, thus making it possible to enhance the proton conductivity, and enabling the fuel cell to have lower resistance and enhanced output. The wet tensile modulus per cross-sectional area is calculated using the method described in (16) in the section of EXAMPLES.

For the electrolyte membrane, the wet tensile modulus/the dry tensile modulus, that is, a value obtained by dividing the wet tensile modulus per width by the dry tensile modulus per width is preferably 0.3 or more, more preferably 0.35 or more. Having 0.3 or more as the wet tensile modulus/the dry tensile modulus decreases the difference in the mechanical characteristics between in a dry state and in a wet state, and thus, makes it possible to suppress generation of wrinkles and slack during a dry-wet cycle, and enhance the dry-wet cycle durability of the fuel cell.

The wet tensile breaking elongation of the electrolyte membrane is preferably 60% or more, more preferably 100% or more, still more preferably 140% or more. Having a wet tensile breaking elongation of 60% or more makes it more likely that the electrolyte membrane in a wet state where the membrane is softened is not broken even under stress concentration due to wrinkles, slack, or the like during a dry-wet cycle. Thus, the dry-wet cycle durability of the fuel cell can be enhanced. The wet tensile breaking elongation is calculated using the method described in (16) in the section of EXAMPLES.

The electrolyte membrane preferably has a wet tensile breaking strength of 5 N/cm or more, more preferably 5.5 N/cm or more, still more preferably 6 N/cm or more. Having a wet tensile breaking strength of 5 N/cm or more makes it more likely that the electrolyte membrane in a wet state where the membrane is softened is not broken even under stress concentration due to wrinkles, slack, or the like during a dry-wet cycle. Thus, the dry-wet cycle durability of the fuel cell can be enhanced. The wet tensile breaking elongation is calculated using the method described in (16) in the section of EXAMPLES.

The filling rate of the polymer electrolyte in the composite layer is preferably 50% or more, more preferably 60% or more. In cases where the filling rate in the composite layer is 50% or more, forming a continuous proton conduction path in the whole composite polymer electrolyte membrane makes it possible to enhance the power generation performance. The filling rate in the composite layer in the present invention is a value indicating the percentage of the polymer electrolyte in the total volume of the composite layer, and can be calculated from the ion exchange capacity (IEC). Specifically, the filling rate is calculated by the method described in (4) in the section of EXAMPLES.

The electrolyte membrane may have, on either side or one side of the composite layer, a polymer electrolyte layer that does not form a composite with a reinforcing material such as a porous substrate. When the composite electrolyte membrane has such a layer, it is possible to improve the bondability between the electrolyte membrane and the electrode, and to suppress interface delamination. When a polymer electrolyte layer that does not form a composite with a reinforcing material is formed in contact with either side or one side of the composite layer, the polymer electrolyte that constitutes the polymer electrolyte layer is preferably the same polymer as the polymer electrolyte filled in the composite layer.

Allowing an electrolyte membrane according to the present invention to have the composite layer makes it possible to reduce the dimension change rate in the plane direction. A smaller dimension change rate of the composite electrolyte membrane in the plane direction thereof, in use of the composite electrolyte membrane as an electrolyte membrane of a fuel cell, can reduce the stress due to swelling and shrinkage of the electrolyte membrane at the edge portion during a dry-wet cycle, and easily improve the durability. The dimension change rate $\lambda_{xy}$ of the electrolyte membrane in the plane direction thereof is preferably 10% or less, more preferably 8% or less, still more preferably 5% or less.

Further, the dimension change rate of the electrolyte membrane in the plane direction thereof preferably has small anisotropy in the MD and the TD. Specifically, it is preferable that the ratio of the dimension change rate in the MD ($\lambda_{MD}$) to the dimension change rate in the TD ($\lambda_{TD}$), that is, $\lambda_{MD}/\lambda_{TD}$ satisfy $0.5 \leq \lambda_{MD}/\lambda_{TD} \leq 2.0$. Herein, "MD" is an abbreviation for Machine Direction, and means the direction in which the porous substrate, the coater, or the coated substrate is moved in the production process of the electrolyte membrane described later. Which of the porous substrate, the coater, and the coated substrate is to be moved is appropriately determined according to the coating process and is not particularly limited. When a process in which a plurality of elements among the porous substrate, the coater, and the coated substrate are moved is employed, usually, all the elements are often moved in the same direction. However, a process in which the elements are moved in different directions may be employed. In this case, whether or not the coated substrate (1), the coater (2), and the porous substrate (3) are moved is judged in this order, and the moving direction of the element in the first place among the moving elements is defined as the MD. "TD" is an abbreviation for Traverse Direction, and is a direction orthogonal to the MD in the plane direction of the electrolyte membrane.

In cases where the ratio ($\lambda_{MD}/\lambda_{TD}$) of the dimension change rate $\lambda_{MD}$ in the MD to the dimension change rate $\lambda_{TD}$ in the TD satisfies $0.5 \leq \lambda_{MD}/\lambda_{TD} \leq 2.0$, the cell design for the fuel cell is not restricted, and the concentration of stress due to swells and shrinks is small even at the edge orthogonal to the MD or the TD, in whichever direction the dimension change is larger. Accordingly, the edge is less likely to become the starting point for breaking of the electrolyte membrane, thus making it possible to enhance the dry-wet cycle durability.

Herein, the dimension change rate is an index representing the change between the dimension of the electrolyte membrane in a dry state and the dimension of the electrolyte membrane in a wet state. Specifically, the dimension change rate is measured by the method described in (6) in the section of EXAMPLES.

The thickness of the layer in the composite electrolyte membrane is not particularly limited, but is preferably 0.5 μm or more, more preferably 1 μm or more. In addition, the thickness is preferably 50 μm or less, more preferably 40 μm or less. That the composite layer is 0.5 μm or more and 50 μm or less makes it possible to obtain a composite polymer electrolyte membrane that has high proton conductivity, is enabled to suppress electrical short circuit and fuel permeation, and has excellent dry-wet cycle durability.

The electrolyte membrane preferably has a haze of 20% or more and 45% or less, more preferably 30% or more and 45% or less, still more preferably 35% or more and 45% or less, when transmitting a light beam in the thickness direction. In cases where a substance different in the refractive index from a polymer electrolyte such as a porous substrate exists in the electrolyte membrane, light is scattered at the interface with the substance different in the refractive index from the polymer electrolyte, thus causing haze in some cases. With a haze of 20% or more and 45% or less, a polymer electrolyte which serves for proton conduction and a porous substrate which serves for enhancement of mechanical characteristics such as elastic modulus, breaking elongation, and breaking strength are made into a composite in a well-balanced manner. Forming such a composite makes it possible to obtain an electrolyte membrane having excellent proton conductivity and mechanical characteristics, and enables the fuel cell to have both excellent output and dry-wet cycle durability. The haze is calculated using the method described in (17) in the section of EXAMPLES.

The electrolyte membrane preferably has a diffuse transmittance of 20% or more and 40% or less, more preferably 30% or more and 40% or less, when transmitting a light beam in the thickness direction. Having a diffuse transmittance of 20% or more and 40% or less makes it possible to obtain an electrolyte membrane having excellent proton conductivity and mechanical characteristics, and enables the fuel cell to have both excellent output and dry-wet cycle durability. The diffuse transmittance is calculated using the method described in (17) in the section of EXAMPLES.

[Polymer Electrolyte]

The polymer electrolyte used in the present invention is a polymer having proton conductivity owing to an ionic group contained therein, and may be either a fluoropolymer electrolyte or a hydrocarbon polymer.

Herein, the "fluoropolymer electrolyte" means an electrolyte in which most or all of hydrogen atoms of an alkyl group and/or an alkylene group in the polymer are substituted with fluorine atoms. Typical examples of the fluoropolymer electrolyte having an ionic group include commercially available products such as "Nafion" (registered trademark) (manufactured by The Chemours Company), "Aquivion" (registered trademark) (manufactured by Solvay Japan, Ltd.), "FLEMION" (registered trademark) (manufactured by AGC Inc.), and "Aciplex" (registered trademark) (manufactured by Asahi Kasei Corporation).

These fluoropolymer electrolytes are generally very expensive, and in addition, tend to exhibit significant gas crossover. Therefore, the polymer electrolyte used in the present invention is preferably a hydrocarbon polymer also from the viewpoint of mechanical strength, dry-wet cycle durability, chemical stability and the like. Specifically, in the present invention, the polymer electrolyte is preferably an ionic group-containing hydrocarbon polymer. Specifically, the embodiment in which the polymer electrolyte is a hydrocarbon polymer is particularly preferable also in that the composite membrane according to the present invention has excellent mechanical characteristics either in a dry state or in a wet state.

The hydrocarbon polymer is preferably an aromatic hydrocarbon polymer having an aromatic ring in the main chain. Here, examples of aromatic rings may include not only hydrocarbon aromatic rings composed of only carbon atoms and hydrogen atoms, such as a benzene ring and a naphthalene skeleton, but also heterocycles such as a pyridine ring, imidazole ring, and thiol ring, and the like. In addition, the hydrocarbon polymer may be partially formed from an aliphatic unit together with the aromatic ring unit.

Specific examples of the aromatic hydrocarbon polymer include polymers having, in the main chain, a structure selected from polysulfone, polyether sulfone, polyphenylene oxide, a polyarylene ether polymer, polyphenylene sulfide, polyphenylene sulfide sulfone, polyparaphenylene, a polyarylene polymer, polyarylene ketone, polyether ketone, polyarylene phosphine oxide, polyether phosphine oxide, polybenzoxazole, polybenzothiazole, polybenzimidazole, polyamide, polyimide, polyetherimide, and polyimidesulfone together with an aromatic ring. Note that "polysulfone", "polyether sulfone", "polyether ketone", and the like referred to herein are generic terms for structures having a sulfone bond, an ether bond, or a ketone bond in their molecular chains, and encompass polyether ketone ketone, polyether ether ketone, polyether ether ketone ketone, polyether ketone ether ketone ketone, and polyether ketone sulfone. The hydrocarbon skeleton may have a plurality of structures among the above-mentioned structures. Above all, a polymer having a polyether ketone skeleton, that is, a polyether ketone polymer is most preferable for the aromatic hydrocarbon polymer.

The polymer electrolyte is suitably an electrolyte that forms a co-continuous or lamellar phase-separation structure. Such a phase-separation structure may be exhibited, for example, in a molded product containing a polymer blend of two or more incompatible polymers, such as an ionic group-containing hydrophilic polymer and an ionic group-free hydrophobic polymer, or a block copolymer including two or more incompatible segments, such as an ionic group-containing segment ($S_{E1}$) and an ionic group-free segment ($S_{E2}$). In a co-continuous or lamellar phase-separation structure, both hydrophilic and hydrophobic domains form a continuous phase, so that continuous proton conduction channels are formed, and an electrolyte membrane excellent in proton conductivity is likely to be obtained. At the same time, a continuous hydrophobic skeleton is formed, thus making it more likely to obtain an electrolyte membrane having excellent mechanical characteristics not only in a dry state but also in a wet state. Herein, the "domain" means a mass formed by aggregation of similar substances or segments in one membrane.

The polymer electrolyte is particularly preferably a block copolymer having at least one ionic group-containing segment ($S_{E1}$) and at least one ionic group-free segment ($S_{E2}$). Herein, the "segment" means a partial structure that is present in a polymer chain of a copolymer and includes repeating units exhibiting specific properties, and has a molecular weight of 2,000 or more. Use of a block copolymer makes it possible to exhibit a co-continuous or lamellar phase-separation structure having finer domains than in the case of a polymer blend, and to achieve more excellent power generation performance and dry-wet cycle durability.

Hereinafter, the ionic group-containing segment ($S_{E1}$) or polymer may be referred to as an "ionic block", and the ionic group-free segment ($S_{E2}$) or polymer may be referred to as a "nonionic block". However, the phrase "ionic group-free" herein does not exclude an embodiment in which the segment or polymer contains a small amount of ionic groups to the extent that the formation of the phase-separation structure is not inhibited.

In such a block copolymer, the molar composition ratio of the ionic block to the nonionic block ($S_{E1}/S_{E2}$) is preferably 0.20 or more, more preferably 0.33 or more, still more preferably 0.50 or more. Further, the molar composition ratio ($S_{E1}/S_{E2}$) is preferably 5.00 or less, more preferably 3.00 or less, still more preferably 2.50 or less. The molar composition ratio ($S_{E1}/S_{E2}$) of 0.20 or more and 5.00 or less makes it possible to obtain a composite polymer electrolyte membrane having high proton conductivity under low humidification conditions, and also having excellent hot water resistance and dry-wet cycle durability. Herein, the molar composition ratio ($S_{E1}/S_{E2}$) represents the ratio of the number of moles of repeating units present in the ionic block to the number of moles of repeating units present in the nonionic block. The "number of moles of repeating units" is a value obtained by dividing the number average molecular weight of the ionic block or the nonionic block by the molecular weight of the corresponding constituent unit.

The ionic group contained in the polymer electrolyte may be any ionic group having a proton exchange ability. Such a functional group is preferably a sulfonic acid group, a sulfonimide group, a sulfuric acid group, a phosphonic acid group, a phosphoric acid group, or a carboxylic acid group. The polymer may contain two or more types of ionic groups. Above all, it is more preferable that the polymer have at least one group selected from a sulfonic acid group, a sulfonimide group, and a sulfuric acid group from the viewpoint of high proton conductivity, and it is most preferable that the polymer have a sulfonic acid group from the viewpoint of raw material cost.

The polymer electrolyte preferably has an ion exchange capacity (IEC) of 0.1 meq/g or more and 5.0 meq/g or less in view of the balance between proton conductivity and water resistance. The IEC is more preferably 1.4 meq/g or more, still more preferably 1.7 meq/g or more. Meanwhile, the IEC is more preferably 3.5 meq/g or less, still more preferably 3.0 meq/g or less. The IEC of 0.1 meq/g or more and 5.0 meq/g or less makes it possible to achieve both excellent proton conductivity and water resistance.

Herein, the "IEC" refers to the molar amount of ionic groups introduced per unit dry weight of the polymer electrolyte. The larger the value of the IEC is, the larger the introduction amount of ionic groups is. In the present invention, the IEC is defined as a value obtained by the neutralization titration method. The IEC is calculated by the neutralization titration according to the method described in (2) in the section of EXAMPLES.

In the present invention, it is particularly preferable to use an aromatic hydrocarbon block copolymer as the polymer electrolyte, and the aromatic hydrocarbon block copolymer is more preferably a polyether ketone block copolymer. Among others, it is particularly preferable to use a polyether ketone block copolymer including a segment containing an ionic group-containing constituent unit represented by the following general formula (S1) and a segment containing an ionic group-free constituent unit represented by the following general formula (S2).

[Chemical Formula 1]

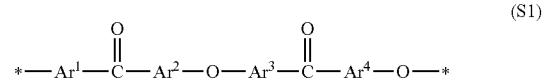

(S1)

In the general formula (S1), $Ar^1$ to $Ar^4$ each represent an arbitrary divalent arylene group, $Ar^1$ and/or $Ar^2$ contains an ionic group, and $Ar^3$ and $Ar^4$ may or may not contain an ionic group. $Ar^1$ to $Ar^4$ may be optionally substituted, and may each independently be two or more types of arylene groups. The symbol * represents a binding site to the constituent unit of the general formula (S1) or another constituent unit.

[Chemical Formula 2]

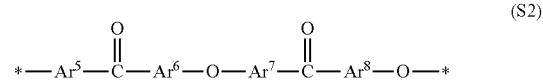

(S2)

In the general formula (S2), $Ar^5$ to $Ar^8$ each represent an arbitrary divalent arylene group and may be optionally substituted, but do not contain an ionic group. $Ar^5$ to $Ar^8$ may each independently be two or more types of arylene groups. The symbol * represents a binding site to the constituent unit of the general formula (S2) or another constituent unit.

Herein, examples of the divalent arylene group preferable for $Ar^1$ to $Ar^8$ include hydrocarbon arylene groups such as a phenylene group, a naphthylene group, a biphenylene group, and a fluorenediyl group, and heteroarylene groups such as pyridinediyl, quinoxalinediyl, and thiophenediyl, but are not limited thereto. Herein, as for the "phenylene group", there may be three types of phenylene groups including an o-phenylene group, an m-phenylene group, and a p-phenylene group depending on the position of the binding site between the benzene ring and another constituent unit, and the term "phenylene group" is used as a generic term for those groups unless otherwise specified herein. The same applies to other divalent arylene groups such as the "naphthylene group" and the "biphenylene group". $Ar^1$ to $Ar^8$ are preferably phenylene groups and ionic group-containing phenylene groups, most preferably p-phenylene groups and ionic group-containing p-phenylene groups. Further, $Ar^5$ to $Ar^8$ may be substituted with a group other than an ionic group, but it is more preferable that $Ar^5$ to $Ar^8$ be unsubstituted groups in terms of proton conductivity, chemical stability, and dry-wet cycle durability.

Further, in order to achieve sufficient dimensional stability, mechanical strength, dry-wet cycle durability, fuel barrier properties, and solvent resistance, the polymer electrolyte is preferably an aromatic hydrocarbon polymer having crystallinity. Herein, "having crystallinity" means that the polymer electrolyte has a crystallizable property and is capable of being crystallized when heated, or has already been crystallized.

Whether the polymer electrolyte has crystallinity or not is examined by differential scanning calorimetry (DSC) or wide-angle X-ray diffractometry. In the present invention, it is preferable that the heat of crystallization measured by differential scanning calorimetry after film formation be 0.1

J/g or more, or that the degree of crystallinity measured by wide-angle X-ray diffractometry be 0.5% or more. More specifically, when no crystallization peak is observed in the differential scanning calorimetry, it is considered that the polymer electrolyte has already been crystallized or is amorphous. When the polymer electrolyte has already been crystallized, the polymer electrolyte has a degree of crystallinity of 0.5% or more as measured by wide-angle X-ray diffractometry.

The aromatic hydrocarbon polymer having crystallinity may be poor in the processability into the electrolyte membrane. In such a case, a protecting group may be introduced into the aromatic hydrocarbon polymer to temporarily suppress the crystallinity. Specifically, the aromatic hydrocarbon polymer having crystallinity can be used as the polymer electrolyte in the present invention by forming a film from the aromatic hydrocarbon polymer in which a protecting group is introduced, and then deprotecting the polymer.

[Porous Substrate]

Porous substrates to be used in the present invention are classified into hydrocarbon porous substrates containing a hydrocarbon polymer compound as a main component and fluorinated porous substrates containing a fluoropolymer compound as a main component. Examples of hydrocarbon polymer compounds include, but are not limited to, polyethylene (PE), polypropylene (PP), polystyrene (PS), polyacrylate, polymethacrylate, polyvinyl chloride (PVC), polyvinylidene chloride (PVdC), polyester, polycarbonate (PC), polysulfone (PSU), polyether sulfone (PES), polyphenylene oxide (PPO), polyarylene ether polymer, polyphenylene sulfide (PPS), polyphenylene sulfide sulfone, polyparaphenylene (PPP), polyarylene polymer, polyarylene ketone, polyether ketone (PEK), polyarylene phosphine oxide, polyether phosphine oxide, polybenzoxazole (PBO), polybenzothiazole (PBT), polybenzimidazole (PBI), polyamide (PA), polyimide (PI), polyetherimide (PEI), polyimidesulfone (PIS), and the like. Examples of fluoropolymer compounds include, but are not limited to, polytetrafluoroethylene (PTFE), polyhexafluoropropylene, tetrafluoroethylene-hexafluoropropylene copolymers (FEP), ethylene-tetrafluoroethylene copolymers (ETFE), polyvinylidene fluoride (PVdF), polychlorotrifluoroethylene (PCTFE), perfluoroalkoxy fluorine resins (PFA), ethylene-chlorotrifluoroethylene copolymers (ECTFE), and the like. From the viewpoints of water resistance, chemical resistance, and mechanical characteristics, PE, PP, PPS, PEK, PBO, PBT, PBI, PTFE, polyhexafluoropropylene, FEP, and PFA are preferable.

A fluorinated porous substrate generally contains a fluoropolymer compound having extremely high hydrophobicity as a main component, and thus, making the material and a polymer electrolyte into a composite has a high effect of providing the electrolyte membrane with water resistance, enhancing the mechanical characteristics of the membrane in a wet state, and suppressing the dimension change. In addition, a fluorine atom-containing polymer compound generally has low solubility in chemicals and is stable to chemical reactions, and accordingly, the compound can impart chemical resistance and chemical durability to the electrolyte membrane, and thus, is preferable. PTFE, polyhexafluoropropylene, FEP, and PFA are more preferable from the viewpoints of chemical resistance and chemical durability, and PTFE is particularly preferable because it has high mechanical strength due to molecular orientation.

From the viewpoint of water resistance, the porous substrate is preferably a fluorinated porous substrate containing 50 mass % or more of fluorine atoms, more preferably a fluorinated porous substrate containing 60 mass % or more of fluorine atoms, and particularly preferably a fluorinated porous substrate containing 70 mass % or more of fluorine atoms. The fluorine atom content of the porous substrate is a value measured by burning the porous substrate to generate a gas, making a solution absorb the gas, and subjecting the solution to ion chromatography. Specifically, the fluorine atom content can be measured by the method described in (10) in the section of EXAMPLES described later.

The oxygen atom content of the porous substrate is preferably 10 mass % or less, more preferably 8% or less, still more preferably 5% or less, as measured by X-ray photoelectron spectroscopy (XPS). The oxygen atom content in the preferable range makes it possible to prevent the water absorbability of the porous substrate from increasing and suppress the dimension change of the electrolyte membrane that has absorbed water. Specifically, the oxygen atom content of the porous substrate can be measured by the method described in (14) in the section of EXAMPLES described later.

In general, an aromatic hydrocarbon porous substrate having, as a main component, a hydrocarbon polymer compound having an aromatic ring as the main chain is also a hydrophobic compound, has excellent elastic modulus and breaking strength, and thus, can be used suitably. Among these, PPS, PBO, PBT, PBI, and PEK are more preferable from the viewpoints of elastic modulus, breaking strength, and chemical durability. PBO, PBT, and PBI, which are polyazole compounds, are particularly preferable from the viewpoints of chemical resistance and processability. PBI is most preferable from the viewpoints of cost and the quantity of commercial distribution.

Incidentally, when the porous substrate present in the electrolyte membrane forming a composite with the polymer electrolyte is analyzed, it is possible to extract only the porous substrate by immersing the electrolyte membrane in a solvent that dissolves only the polymer electrolyte.

Examples of the form of the porous substrate include: a stretched microporous film obtained by stretching a raw material film in the film plane direction to form micropores; a wet-solidified microporous film obtained by preparing a solution of a raw material, forming a film from the material, and immersing the film in a poor solvent for the raw material in a state where the film still contains the solvent to solidify the film; a nonwoven fabric made from a solution-spun fiber that is obtained by spinning a solution of a raw material; and a nonwoven fabric made from a melt-spun fiber that is obtained by melt-spinning a raw material for the porous substrate.

Examples of the solution spinning method include: a dry spinning method in which a raw material solution is discharged from a spinneret into a fiber shape under high pressure, and the solution is dried with hot air; a wet spinning method in which a raw material solution is discharged into a fiber shape, and the solution is immersed in a poor solvent for the raw material to be solidified; and electrospinning in which a raw material solution is discharged into a space to which a high voltage is applied, and the solution is pulled into a fiber shape by static electricity.

Examples of the melt spinning method include meltblown spinning in which a molten raw material for the porous substrate is discharged from a spinneret into a fiber shape.

The porous substrate preferably has a structure in which thick fiber-shaped nodes are arrayed generally in parallel in the in-plane direction. Having such a structure makes it possible to obtain an electrolyte membrane that, particularly in a wet state, has excellent mechanical characteristics in the direction parallel to the nodes.

The porous substrate preferably contains a node having an aspect ratio of 10 or more, as calculated from length/diameter, more preferably contains a node having an aspect ratio of 20 or more, still more preferably contains a node having an aspect ratio of 50 or more. The porous substrate containing a node having an aspect ratio of 10 or more has a structure having consecutive firm hydrophobic skeletons, and thus, suppresses the softening of the whole membrane not only in a dry state but also in a wet state where the polymer electrolyte is usually softened by water absorption. Thus, it is possible to obtain an electrolyte membrane having excellent mechanical characteristics, and to enhance the dry-wet cycle durability of the fuel cell.

The average diameter of the node is preferably 0.01 μm or more, more preferably 0.1 μm, still more preferably 0.2 μm. In addition, the average diameter is preferably 10 μm or less, more preferably 5 μm or less, still more preferably 2 μm or less. The node having an average diameter of 0.01 μm or more and 10 μm or less makes it possible to suppress the softening of an electrolyte membrane in a wet state, and to obtain an electrolyte membrane having high proton conductivity, and thus, makes it possible to produce a fuel cell having high output.

The porous substrate preferably has thin fiber-shaped fibrils that form a ladder-like structure in which the nodes are linked between one another in the in-plane direction. The porous substrate more preferably contains the fibrils arrayed generally orthogonally to the nodes. Having such a structure makes it possible to obtain an electrolyte membrane that, particularly in a wet state, has excellent mechanical characteristics in the in-plane direction, not only in the direction parallel to the nodes but also in the direction orthogonal to the nodes.

The diameter ratio calculated from the average diameter of the nodes/the average diameter of the fibrils is preferably 2 or more, more preferably 3 or more, still more preferably 5 or more. In addition, the diameter ratio is preferably 20 or less, more preferably 10 or less. In cases where the porous substrate having a diameter ratio of 2 or more and 20 or less is used, suppressing the hindering of proton conduction by the nodes makes it possible to obtain an electrolyte membrane having high proton conductivity, and thus, to produce a fuel cell having high output, and at the same time, makes it possible to suppress swelling in the direction orthogonal to the nodes and/or the direction parallel to the nodes, thus making it possible to produce a composite polymer electrolyte membrane having smaller anisotropy and excellent mechanical characteristics.

Here, for example, the structure of the porous substrate, for example, the direction and average diameter of the node and the direction and average diameter of the fibril, can be analyzed using a scanning electron microscope (SEM) in accordance with the method described in (18) in the section of EXAMPLES.

The thickness of the porous substrate used in the present invention is not particularly limited, and is determined according to the use of the electrolyte membrane. A porous substrate having a film thickness of 0.5 μm or more and 50 μm or less is practically used, and a porous substrate having a film thickness of 1 μm or more and 40 μm or less is preferably used.

The porosity of the porous substrate before forming a composite with the polymer electrolyte is not particularly limited. However, from the viewpoint of achieving both the proton conductivity and the mechanical strength of the electrolyte membrane obtained from the porous substrate, the porosity of the porous substrate is preferably 50 to 98%, more preferably 70 to 98%. The porosity $Y1$ (volume %) of the porous substrate is defined as a value calculated by the following mathematical formula.

$$Y1=(1-db/Da)\times 100$$

(wherein Da is the specific gravity of the raw material constituting the porous substrate, and db is the specific gravity of the entire porous substrate.)

[Nonionic Fluorinated Surfactant]

The electrolyte membrane according to the present invention preferably contains a nonionic fluorinated surfactant (hereinafter sometimes simply referred to as a "surfactant"). Using a nonionic fluorinated surfactant and thus enhancing the affinity between the polymer electrolyte and the porous substrate makes it possible not only to produce an electrolyte membrane more easily but also to firm up the interfacial bonding between the polymer electrolyte and the porous substrate in the electrolyte membrane, and suppress interface delamination caused between both by a change in the volume of the electrolyte membrane during the dry-wet cycle, thereby making it possible to enhance the dry-wet cycle durability of the fuel cell. In particular, in cases where a hydrocarbon polymer electrolyte and a fluorinated porous substrate are used, using a nonionic fluorinated surfactant can enhance the affinity between both markedly, and thus, is more preferable.

The surfactant is preferably a compound having a fluorine-containing group including a fluorinated alkyl group, a fluorinated alkenyl group, or a fluorinated aryl group, which results from substitution of a hydrogen atom in an alkyl group, an alkenyl group, or an aryl group with a fluorine atom, and a nonionic lyophilic group (a hydrophilic group or a lipophilic group).

The fluorine-containing group is preferably a perfluoroalkyl group, a perfluoroalkenyl group, or a perfluoroaryl group, which results from substitution of all the hydrogen atoms in an alkyl group, an alkenyl group, or an aryl group with fluorine atoms.

The fluorine-containing group is more preferably a fluorinated alkenyl group or a fluorinated aryl group because the group has an excellent surfactant effect, and is more preferably a fluorinated alkenyl group because the group has a flexible structure and exhibits a potent surfactant action.

The fluorine-containing group preferably has 2 or more carbon atoms, more preferably has 4 or more carbon atoms, particularly preferably has 6 or more carbon atoms. Meanwhile, the fluorine-containing group preferably has 20 or less carbon atoms, more preferably has 15 or less carbon atoms, particularly preferably has 10 or less carbon atoms. In cases where the carbon number is within the preferable range, such a surfactant has suitable volatility and water solubility, and remains in the electrolyte membrane, thus exhibiting excellent dry-wet cycle durability. In addition, such a surfactant does not easily undergo phase separation from the polymer electrolyte, thus having excellent dry-wet cycle durability.

Specific examples of the fluorinated alkyl group include a fluorinated ethyl group, a fluorinated propyl group, a fluorinated butyl group, a fluorinated pentyl group, a fluorinated hexyl group, a fluorinated heptyl group, a fluorinated octyl group, a fluorinated nonyl group, and a fluorinated decyl group, but are not limited thereto.

Further, specific examples of the fluorinated alkenyl group include a fluorinated ethenyl group, a fluorinated propenyl group, a fluorinated butenyl group, a fluorinated pentenyl group, a fluorinated hexenyl group, a fluorinated heptenyl group, a fluorinated octenyl group, a fluorinated nonenyl group, and a fluorinated decenyl group, but are not limited thereto.

Above all, a fluorinated hexyl group, a fluorinated heptyl group, a fluorinated octyl group, a fluorinated nonyl group, a fluorinated decyl group, a fluorinated hexenyl group, a fluorinated heptenyl group, a fluorinated octenyl group, a fluorinated nonenyl group, and a fluorinated decenyl group are more preferable because they have low volatility and low water solubility and tend to remain in the electrolyte membrane. Herein, the "fluorinated ethyl group" encompasses five types of functional groups including a monofluoroethyl group, a difluoroethyl group, a trifluoroethyl group, a tetrafluoroethyl group, and a pentafluoroethyl group depending on the number of fluorine atoms included in one functional group, and the term "fluorinated ethyl group" herein is used as a generic term for those groups. The same applies to other functional groups such as the "fluorinated propyl group" and the "fluorinated butyl group". Further, the "difluoroethyl group" is a functional group having two carbon atoms and two fluorine atoms, and there are three types of structural isomers including a 1,1-difluoroethyl group, a 1,2-difluoroethyl group, and a 2,2-difluoroethyl group. The term "difluoroethyl group" herein is used as a generic term for those groups. The same applies to other functional groups such as the "trifluoroethyl group" and the "tetrafluoroethyl group". In addition, the name "butyl group" in the "fluorinated butyl group" is a generic term that represents a functional group composed of a skeleton having four carbon atoms, and there are four types of structures: a butyl group, 1-methylpropyl group, 2-methylpropyl group, and 1,1-dimethylethyl group. The "butyl group" as used herein is the generic term for those groups. The same applies to other functional groups such as the "fluorinated pentyl group" and the "fluorinated hexyl group".

The fluorine-containing group may have a linear, branched, or cyclic structure. The branched structure is preferable because the structure may weaken the interaction between the fluorine compound molecules and may easily lower the surface tension of the surfactant. In the present invention, a surfactant having a fluorine-containing group including a structure represented by the following formula (F1) is particularly preferable.

[Chemical Formula 3]

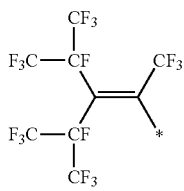

(F1)

In the formula (F1), the symbol * means a binding site with another atomic group.

The nonionic fluorinated surfactant is suitably a compound containing 10 mass % or more of fluorine atoms in one molecule. The nonionic fluorinated surfactant is more preferably a compound containing 20 mass % or more of fluorine atoms, still more preferably a compound containing 40 mass % or more of fluorine atoms. If the content of fluorine atoms in one molecule is within the preferable range, the affinity with the porous substrate is excellent, and a sufficient effect of improving the power generation performance can be obtained. Further, since such a nonionic fluorinated surfactant has low solubility in water and acids, the nonionic fluorinated surfactant is not easily dissolved in water or an acid generated during the operation of an electrochemical cell such as a fuel cell. Accordingly, without being eluted from the electrolyte membrane, the nonionic fluorinated surfactant makes it possible to prevent the affinity between the polymer electrolyte and the catalyst layer from decreasing.

The lyophilic group may be a hydrophilic group or a lipophilic group, but is preferably a hydrophilic group.

The hydrophilic group is not particularly limited as long as it is a nonionic group having a hydrophilic element selected from the group consisting of oxygen, nitrogen, phosphorus, sulfur, and boron. The hydrophilic group is preferably a group including a polyether group, a carboxylic acid ester group, a sulfonic acid ester group, a phosphorus acid ester group, or a phosphoric acid ester group, and is more preferably a group including a polyether group because the polyether group is excellent in the affinity with the polymer electrolyte due to a hydrogen bond formed between the polyether group and the ionic group, and is also excellent in chemical stability. Above all, it is preferable that the hydrophilic group be a group having a polyalkyl ether structure represented by the following general formula (C1) or a polyacrylate structure represented by the following general formula (C2), and it is more preferable that the hydrophilic group be a polyalkyl ether represented by the following general formula (C1) because the group is excellent in the affinity with the polymer electrolyte.

[Chemical Formula 4]

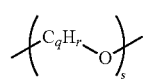

(C1)

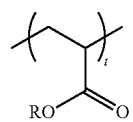

(C2)

In the general formula (C1), q and r are natural numbers that satisfy r=2q, and s is an integer of 1 or more and 1,000 or less and means a repeating number of alkyl ether structures. In the general formula (C2), R is at least one group selected from an alkyl group having 1 to 20 carbon atoms, an alkenyl group having 1 to 20 carbon atoms, and an aryl group having 6 to 20 carbon atoms, and t is an integer of 1 or more and 1,000 or less and means a repeating number of acrylate structures. In the general formula (C1) or (C2), when s or t is 2 or more, the plurality of alkyl ether structures or acrylate structures may be identical or different.

Examples of the lipophilic group include an alkyl group, an alkenyl group, an alkynyl group, and a phenyl group that do not include a fluorine atom.

In the present invention, the nonionic fluorinated surfactant is preferably a compound having a vapor pressure at 150° C. of less than 2 kPa, more preferably a compound having a vapor pressure at 150° C. of 1 kPa or less, and most preferably a compound having no boiling point, that is, a compound that starts thermal decomposition without boiling. In the present invention, it is particularly preferable that the surfactant be a compound having a 5% weight loss temperature of 150° C. or more in thermogravimetry-differential thermal analysis. Such a surfactant can remain in the electrolyte membrane since it does not volatilize or decompose during film formation.

In the present invention, the nonionic fluorinated surfactant is preferably a compound having a weight average molecular weight of 1,000 or more, more preferably 1,500 or more, still more preferably 2,000 or more. Meanwhile, the nonionic fluorinated surfactant is preferably a compound having a weight average molecular weight of 10,000 or less, more preferably 8,000 or less, still more preferably 5,000 or less. If the weight average molecular weight of the surfactant is within the preferable range, the surfactant has suitable volatility and is not easily dissolved in a solvent such as water. Accordingly, the affinity between the polymer electrolyte and the porous substrate or the below-mentioned catalyst layer is maintained, and the membrane is not easily delaminated or broken at the interface between them, and thus, has excellent durability. On the other hand, only the surfactant aggregates in the electrolyte membrane, making it difficult to form a sea-island-like phase-separation structure. Accordingly, the membrane is not easily broken at the interface between the surfactant and the polymer electrolyte or the porous substrate, and thus, has excellent durability.

In the surfactant, the fluorine-containing group preferably has a molecular weight of 200 or more, more preferably 400 or more, still more preferably 1,000 or more. Meanwhile, the fluorine-containing group preferably has a molecular weight of 5,000 or less, more preferably 3,000 or less, still more preferably 2,000 or less. If the molecular weight of the fluorine-containing group is within the preferable range, the molecular chain in the fluorine-containing group has excellent flexibility and degree of freedom. Accordingly, the affinity with the porous substrate or the catalyst layer is maintained, and the membrane is not easily delaminated or broken at the interface with the polymer electrolyte, and thus, has excellent durability. On the other hand, only the surfactant aggregates in the electrolyte membrane, making it difficult to form a sea-island-like phase-separation structure. Accordingly, the membrane is not easily broken at the interface between the surfactant and the polymer electrolyte or the porous substrate to have excellent durability.

In the case of a surfactant having a hydrophilic group as the lyophilic group, the molecular weight of the hydrophilic group is preferably 100 or more, more preferably 200 or more, still more preferably 500 or more. Meanwhile, the molecular weight of the hydrophilic group is preferably 4,000 or less, more preferably 2,500 or less, still more preferably 1,500 or less. If the molecular weight of the hydrophilic group is within the preferable range, the molecular chain in the hydrophilic group has excellent flexibility and degree of freedom. Accordingly, the affinity with the polymer electrolyte is maintained, and the membrane is not easily broken at the interface with the porous substrate, and thus, has excellent durability. On the other hand, owing to suitable water solubility, the surfactant is not easily dissolved in water or an acid generated during the operation of an electrochemical cell such as a fuel cell, and thus, is inhibited from being eluted from the electrolyte membrane. Accordingly, the affinity between the polymer electrolyte and the porous substrate is maintained, and the membrane is not easily broken at the interface between the polymer electrolyte and the porous substrate owing to a dimension change, and thus, has excellent durability.

The surfactant is preferably a compound that is insoluble in any of water, 10% sulfuric acid, and a 10% aqueous sodium hydroxide solution, more preferably a compound that is insoluble in water, and most preferably a compound that is not soluble in any of these. Herein, "insoluble" means that the surfactant has a saturated solubility at 25° C. of less than 0.1 mass %. If the surfactant is insoluble in the above-mentioned solvent and/or solution, the surfactant is not easily dissolved in water or an acid generated during the operation of an electrochemical cell such as a fuel cell, and can be inhibited form being eluted from the electrolyte membrane. Therefore, the affinity between the polymer electrolyte and the porous substrate or the catalyst layer can be maintained, thus making it possible to suppress a decrease caused in durability by delamination or breakage caused at the interface between the polymer electrolyte and the porous substrate or the catalyst layer by a dimension change.

Examples of the nonionic fluorinated surfactant used in the present invention include "MEGAFACE" (registered trademark) F-251, F-253, F-281, F-430, F-477, F-551, F-552, F-553, F-554, F-555, F-556, F-557, F-558, F-559, F-560, F-561, F-562, F-563, F-565, F-568, F-570, F-572, F-574, F-575, F-576, R-40, R-40-LM, R-41, R-94, RS-56, RS-72-K, RS-75, RS-76-E, RS-76-NS, DS-21, F444, and TF-2066 manufactured by DIC Corporation, "Surflon" (registered trademark) S-141, S-145, S-241, S-242, S-243, S-386, S-420, S-611, and S-651 manufactured by AGC Inc., "Ftergent" (registered trademark) 251, 208M, 212M, 215M, 250, 209F, 222F, 245F, 208G, 218GL, 240G, 212P, 220P, 228P, FTX-218, DFX-18, 710FL, 710FM, 710FS, 730FL, 730FM, 610FM, 683, 601AD, 601ADH2, 602A, 650AC, and 681 manufactured by NEOS Company Limited, EF-PP31N04, EF-PP31N09, EF-PP31N15, and EF-PP31N22 manufactured by Mitsubishi Materials Electronic Chemicals Co., Ltd., FC-4430 and FC-4432 manufactured by 3M Company, PF-151N, PF-636, PF-6320, PF-656, PF-6520, PF-652-NF, and PF-3320 manufactured by OMNOVA Solutions Inc., TG-9131 and "ZEFFLE" (registered trademark) GH-701 manufactured by Daikin Industries, Ltd., and "Fluorolink" (registered trademark) A10-P manufactured by Solvay Japan, Ltd.

The electrolyte membrane preferably has a content of the nonionic fluorinated surfactant, in terms of the mass ratio to the total amount of the polymer electrolyte contained in the electrolyte membrane, of 0.005 or more, more preferably 0.01 or more. Meanwhile, the content of the nonionic fluorinated surfactant is preferably 0.20 or less, more preferably 0.10 or less. If the ratio is within the preferable range, the affinity between the polymer electrolyte and the porous substrate or the catalyst layer is maintained, and the membrane is not easily delaminated or broken at the interface between the polymer electrolyte and the porous substrate or the catalyst layer by a dimension change, and thus, has excellent durability. On the other hand, the amount of the surfactant is suitable, and the electrolyte membrane has excellent proton conductivity. It is to be noted that the content of the surfactant herein is the amount of the surfactant remaining in the completed electrolyte membrane, and excludes the amount of the surfactant lost during the production process.

Examples of a method for analyzing the nonionic fluorinated surfactant contained in the electrolyte membrane include a method of dissolving the nonionic fluorinated surfactant together with the polymer electrolyte membrane in a predetermined solvent. It is possible to analyze the chemical structures of various surfactants and calculate the content of the surfactant by subjecting the polymer electrolyte membrane solution and a dried product obtained by removing the solvent from the solution to infrared spectroscopy (IR), $^1$H nuclear magnetic resonance (NMR) analysis, $^{19}$F NMR analysis, MALDI-MS analysis, or pyrolysis GC/MS analysis. In addition, it is also suitable to extract only the nonionic fluorinated surfactant by subjecting the solution and the dried product to general purification treatment such as solvent extraction or reprecipitation, and analyze the nonionic fluorinated surfactant.

The solvent used in the analysis of the nonionic surfactant may be appropriately selected according to the species of the polymer electrolyte and nonionic surfactant that constitute the electrolyte membrane. Examples of the suitably used solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, carbonate solvents such as ethylene carbonate and propylene carbonate, alkylene glycol monoalkyl ethers such as ethylene glycol monomethyl ether, ethylene glycol monoethyl ether, propylene glycol monomethyl ether, and propylene glycol monoethyl ether, alcohol solvents such as methanol, ethanol, propanol, and butanol alcohol, ketone solvents such as acetone, methyl ethyl ketone, and methyl isobutyl ketone, ester solvents such as γ-butyrolactone, ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, and dichlorobenzene, ether solvents such as diethyl ether, tetrahydrofuran, and 1,4-dioxane, nitrile solvents such as acetonitrile, nitrated hydrocarbon solvents such as nitromethane and nitroethane, and water. A mixed solvent that is a mixture of two or more types of these solvents may also be used. Here, "propanol" has the same structure as the propane molecule except that one of the hydrogen atoms contained in the molecule is substituted with a hydroxyl group, and there are two types of structural isomers: 1-propanol and 2-propanol. "Propanol" as used herein is a generic term for these. The same applies to other solvents such as "butanol" and "xylene".

When the electrolyte membrane is insoluble, a different analytical technique can be used. The electrolyte membrane itself containing the nonionic fluorinated surfactant may be subjected to IR, solid-state NMR analysis, MALDI-MS analysis, or pyrolysis GC/MS analysis to analyze the chemical structure and the content of the surfactant. Analysis performed by immersing the electrolyte membrane in a solvent to dissolve and extract only the nonionic fluorinated surfactant is also suitable.

The nonionic fluorinated surfactant used in the present invention is preferably a surfactant containing no metals as impurities. Herein, the "metals" include simple metal elements, metal ions, nonionic metal compounds, and metal oxides, but are not limited thereto. If the nonionic fluorinated surfactant contains no metal, interaction between metal and the hydrophilic group or lipophilic group of the nonionic fluorinated surfactant is less likely to occur, so that these groups have a high degree of freedom in the polymer electrolyte membrane, and make it possible to maintain the function of the surfactant, thus making it possible to suppress a decrease caused in durability by delamination or breakage caused at the interface between the polymer electrolyte and the porous substrate or the catalyst layer by a dimension change.

[Catalyst Layer]

The catalyst layer is a layer containing catalyst particles and formed in contact with either side of the electrolyte membrane, and is generally a layer containing catalyst particles and a polymer electrolyte containing a fluoropolymer electrolyte. As the fluoropolymer electrolyte, those described above can be used.

In the catalyst coated membrane of the present invention, it is preferable that the catalyst layer contain an ionic group-containing perfluoro polymer in terms of power generation performance and chemical durability. Use of an ionic group-containing perfluoro polymer may increase the acidity of the ionic group contained in the catalyst layer to further improve the proton conductivity, and a large number of chemically stable C—F bonds can further improve the chemical durability of the catalyst layer.

As the catalyst particles, catalyst-supporting carbon particles containing a catalyst substance supported on carbon particles are generally used. Examples of the catalyst substance include not only platinum but also platinum elements such as palladium, ruthenium, iridium, rhodium, and osmium, metals such as iron, lead, copper, chromium, cobalt, nickel, manganese, vanadium, molybdenum, gallium, and aluminum, and alloys, oxides, and double oxides of these metals. The type of carbon particles is not particularly limited as long as they are in the form of fine particles, have conductivity, and do not corrode or deteriorate due to a reaction with the catalyst. Carbon particles such as carbon black, graphite, black lead, activated carbon, carbon fibers, carbon nanotubes, and fullerene particles can be used.

The mass ratio of the content of the polymer electrolyte to the content of the catalyst particles in the catalyst layer is preferably within the range of 0.2 or more and 2.5 or less, particularly preferably 0.5 or more and 2.0 or less. If the mass ratio of the content of the polymer electrolyte to the content of the catalyst particles is within the preferable range, the catalyst layer is less likely to crack, and in addition, has excellent power generation performance without impairing the gas diffusivity.

The thickness of the catalyst layer is preferably 0.03 μm to 2,000 μm. In order to easily obtain good power generation performance and durability, the thickness of the catalyst layer is more preferably 0.5 μm or more, particularly preferably 1 to 30 μm.

<Method for Producing Electrolyte Membrane>

In a first embodiment of the present invention, the electrolyte membrane can be produced by impregnating the porous substrate with a polymer electrolyte solution and then drying the resulting substrate to remove the solvent contained in the polymer electrolyte solution. In this case, a method in which the porous substrate is impregnated with the polymer electrolyte solution mixed with the nonionic fluorinated surfactant in advance is also suitable. The details of the polymer electrolyte, the porous substrate, and the nonionic fluorinated surfactant used in the production methods of the first embodiment and a second embodiment described later are as described above, and are omitted here.

As described above, the content of the surfactant in the polymer electrolyte solution is preferably 0.005 or more, more preferably 0.01 or more in terms of the mass ratio to the total amount of the polymer electrolyte. Meanwhile, the content of the surfactant is preferably 0.20 or less, more preferably 0.10 or less. If the ratio is within the preferable range, the affinity between the polymer electrolyte and the catalyst layer is maintained, and a sufficient effect of improving the power generation performance is obtained. On the other hand, the amount of the surfactant is suitable, and the electrolyte membrane has excellent proton conductivity.

Further, in a second embodiment of the present invention, the electrolyte membrane can be produced by impregnating the porous substrate, to which the nonionic fluorinated surfactant is previously applied, with a polymer electrolyte solution, and then drying the resulting substrate to remove the solvent contained in the polymer electrolyte solution.

In this case, examples of the method for applying the surfactant to the porous substrate include the following:

(1) a method of pulling up the porous substrate immersed in a surfactant solution and removing the excess solution to control the amount of the applied solution;
(2) a method of applying a surfactant solution to the porous substrate by cast coating; and
(3) a method of bonding the porous substrate onto a support substrate to which a surfactant solution is applied by cast coating to impregnate the porous substrate with the surfactant solution.

When the impregnating process is performed in accordance with the method (3), the solvent can be dried as it is. Alternatively, when the impregnating process is performed in accordance with the method (1) or (2), a method of drying the solvent of the fluorine-containing nonionic surfactant solution in a state where the porous substrate is bonded to a separately prepared support substrate is preferable from the viewpoint of reducing the wrinkles and thickness unevenness of the porous substrate and improving the quality.

When the surfactant is liquid or oily, the surfactant itself may be impregnated into the porous substrate in place of the surfactant solution. However, it is preferable to use the surfactant solution containing the surfactant dissolved in a predetermined solvent for the purpose of adjusting the viscosity so that the surfactant may easily penetrate into the porous substrate, or diluting the surfactant solution so that an excessive amount of the surfactant may not be applied to the porous substrate.

As for a method for applying the surfactant solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied.

In the second embodiment, the surfactant is preferably applied in an amount of 1 mass % or more, more preferably 5 mass % or more based on 100 mass % of the porous substrate. Similarly, the surfactant is preferably applied in an amount of 30 mass % or less, more preferably 20 mass % or less. If the amount of the surfactant applied is within the preferable range, the affinity between the polymer electrolyte and the porous substrate is maintained, and it is easy to form a composite. In addition, the amount of the surfactant is suitable, the surfactant is less likely to block the pores of the porous substrate, and the composite electrolyte membrane has excellent proton conductivity.

Further, in the second embodiment, by the application of the surfactant, the contact angle of the solvent used in the polymer electrolyte solution with the surface of the porous substrate is preferably 120° or less, more preferably 80° or less, still more preferably 50° or less. If the contact angle is within the preferable range, the surfactant-containing porous substrate is more easily impregnated with the polymer electrolyte solution.

Further, in the second embodiment, it is preferable to use, as the surfactant, a compound insoluble in the solvent of the polymer electrolyte solution to be impregnated into the porous substrate. Use of such a surfactant prevents the diffusion of the surfactant into the polymer electrolyte from the surface of the porous substrate or the surface of the composite electrolyte membrane in contact with the catalyst layer upon impregnation of the porous substrate with the polymer electrolyte solution, and makes it possible to prevent a decrease caused in proton conductivity by the presence of the surfactant in the polymer electrolyte while sufficiently exhibiting the function of the surfactant.

In the first and second embodiments, the concentration of the polymer electrolyte solution is preferably 3 to 40 mass %, more preferably 5 to 25 mass %. If the concentration is within this range, the number of times of coating for filling the polymer electrolyte sufficiently in the pores of the porous substrate can be reduced to approximately one or two, and a composite layer having excellent surface smoothness can be easily obtained.

The viscosity of the polymer electrolyte solution is preferably 100 to 50,000 mPa·s, more preferably 300 to 10,000 mPa·s. If the viscosity is within the preferable range, it is easier to fill the polymer electrolyte in the pores of the porous substrate, it is easier to make the film thickness of the electrolyte membrane uniform, and in addition, the electrolyte membrane has excellent surface smoothness.

The solvent used in the polymer electrolyte solution can be appropriately selected according to the polymer species. Examples of the suitably used solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, carbonate solvents such as ethylene carbonate and propylene carbonate, alkylene glycol monoalkyl ethers such as ethylene glycol monomethyl ether, ethylene glycol monoethyl ether, propylene glycol monomethyl ether, and propylene glycol monoethyl ether, alcohol solvents such as methanol, ethanol, propanol, and butanol, ketone solvents such as acetone, methyl ethyl ketone, and methyl isobutyl ketone, ester solvents such as γ-butyrolactone, ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, and dichlorobenzene, ether solvents such as diethyl ether, tetrahydrofuran, and 1,4-dioxane, nitrile solvents such as acetonitrile, nitrated hydrocarbon solvents such as nitromethane and nitroethane, and water. A mixed solvent that is a mixture of two or more types of these solvents may also be used.

Examples of the method for impregnating the porous substrate with the polymer electrolyte solution include the following:

(1) a method of pulling up the porous substrate immersed in the polymer electrolyte solution and removing the excess solution to control the film thickness;
(2) a method of applying a polymer electrolyte solution to the porous substrate by cast coating; and
(3) a method of bonding the porous substrate onto a support substrate to which a polymer electrolyte solution is applied by cast coating to impregnate the porous substrate with the solution.

When the impregnating process is performed in accordance with the method (3), the solvent can be dried as it is. Alternatively, when the impregnating process is performed in accordance with the method (1) or (2), a method of drying the solvent of the polymer electrolyte solution in a state where the porous substrate is bonded to a separately prepared support substrate is preferable from the viewpoint of reducing the wrinkles and thickness unevenness of the electrolyte membrane and improving the membrane quality.

As for a method for applying the polymer electrolyte solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied. Herein, an apparatus used for applying the polymer electrolyte solution by cast coating is called a coater.

After the polymer electrolyte solution is applied to the substrate, the polymer electrolyte solution is subjected to a drying step to form an electrolyte membrane. In the drying step, the coating film of the polymer electrolyte solution with which the porous substrate is impregnated is heated to evaporate the solvent. The heating means is not particularly limited as long as the means can evaporate the solvent. For example, a heating device such as an oven and a heater, a device for controlling the temperature in the vicinity of the electrolyte membrane with infrared rays, warm air, or the like can be used. Further, heat may be conducted to the coating film via the substrate. As for the heating temperature range, the temperature is preferably close to the boiling point of the solvent and equal to or lower than the glass transition temperature of the electrolyte membrane. It is also possible to remove the solvent only by reducing the pressure or introducing an air flow without heating the coating film.

The drying time and the drying temperature in the drying step can be appropriately determined experimentally, but it is preferable to dry the mixed solution at least to such an extent that a self-supporting membrane is obtained after the membrane is separated from the substrate. The drying method may be selected from known methods such as heating of the substrate, hot air, and an infrared heater. The drying temperature is preferably 200° C. or less, more preferably 150° C. or less in consideration of decomposition of the polymer electrolyte and the surfactant.

The polymer electrolyte in the solution may be an electrolyte in which the ionic group forms a salt with a cation of an alkali metal or an alkaline earth metal. In this case, the method preferably includes, after the step of forming a membrane on the substrate and subjecting the membrane to the drying step, a step of exchanging the cation of an alkali metal or an alkaline earth metal with a proton. This step is more preferably a step of bringing the formed membrane into contact with an acidic aqueous solution. Further, it is still more preferable that the membrane be brought into contact with the acidic aqueous solution by a step of immersing the formed membrane in the acidic aqueous solution. In this step, the proton in the acidic aqueous solution is substituted with the cation that is ionically bonded to the ionic group, and residual water-soluble impurities, residual monomers, solvents, residual salts, and the like are simultaneously removed. The acidic aqueous solution is not particularly limited, and sulfuric acid, hydrochloric acid, nitric acid, acetic acid, trifluoromethanesulfonic acid, methanesulfonic acid, phosphoric acid, citric acid, or the like is preferably used. The temperature and concentration of the acidic aqueous solution are appropriately determined. From the viewpoint of productivity, it is preferable to use an aqueous sulfuric acid solution of 3 mass % or more and 30 mass % or less at a temperature of 0° C. or more and 80° C. or less.

[Method for Producing Catalyst Coated Membrane]

The catalyst coated membrane (hereinafter referred to as CCM) of the present invention includes the electrolyte membrane of the present invention, and a catalyst layer on either side of the electrolyte membrane. The method for forming the catalyst layer is not particularly limited. However, a method of applying a catalyst layer ink and drying the catalyst layer ink, and a method of transferring, using a catalyst layer decal including a catalyst layer formed in advance on a decal substrate, the catalyst layer and then drying the catalyst layer are preferable since the methods have simple steps and can reduce the process cost.

In the case of the method of applying the catalyst layer ink, the application method is not particularly limited as long as the catalyst layer ink can be applied in a desired shape, and the methods described in the above-mentioned step of applying the polymer electrolyte solution can be used.

The solvent contained in the catalyst layer ink is not particularly limited as long as it is a solvent in which the polymer electrolyte and the catalyst-supporting carbon particles can be dispersed, but a solvent that is easy to evaporate and remove by heating is preferable. For example, a solvent having a boiling point of 140° C. or less is preferable. Specific examples of the solvent of the catalyst layer ink include one solvent or a mixture of two or more solvents among water, alcohols such as methanol, ethanol, propanol, butanol, and pentanol, ketones such as acetone, methyl ethyl ketone, pentanone, hexanone, heptanone, cyclohexanone, methylcyclohexanone, acetonylacetone, and diisobutyl ketone, ethers such as tetrahydrofuran, dioxane, diethylene glycol dimethyl ether, anisole, methoxytoluene, and dibutyl ether, esters such as methyl acetate, ethyl acetate, normal propyl acetate, isopropyl acetate, butyl acetate, methyl lactate, ethyl lactate, and butyl lactate, and dimethylformamide, dimethylacetamide, N-methylpyrrolidone, ethylene glycol, diethylene glycol, diacetone alcohol, and 1-methoxy-2-propanol.

In the case of the method of transferring the catalyst layer using the catalyst layer decal, first, the catalyst layer ink is applied to the substrate, and the catalyst layer is subjected to a drying step as necessary to produce the catalyst layer decal. Then, the electrolyte membrane is sandwiched between the catalyst layer decal on the cathode electrode side and the catalyst layer decal on the anode electrode side, and the resulting laminate is hot-pressed so that the surfaces of the decals on which each catalyst layer is provided may come into contact with the electrolyte membrane to produce a catalyst coated membrane. The temperature and pressure in the hot pressing may be appropriately selected according to the thickness and water content of the electrolyte membrane, the catalyst layer, and the decal substrate. From the viewpoint of industrial productivity and suppression of thermal decomposition of the electrolyte membrane material, the temperature is preferably within the range of 0° C. to 250° C., and is more preferably higher than the glass transition temperature of the polymer electrolyte contained in the catalyst layer and 200° C. or less. The pressure applied in the hot pressing is preferably as low as possible from the viewpoint of protecting the electrolyte membrane and the electrodes. In the case of plate pressing, a pressure of 10 MPa or less is preferable.

The decal substrate used in the application of the catalyst layer ink may be the same resin film or substrate as the substrate used in the formation of the electrolyte membrane. Moreover, fluororesins such as PTFE, polyhexafluoropropylene, ETFE, an ethylene-hexafluoropropylene copolymer, FEP, PFA, and PVdF can be used. From the viewpoint of chemical stability and releasability in addition to heat resistance and solvent resistance, it is preferable to use a fluororesin film.

The catalyst layer may be dried by the same method as the method described in the above-mentioned drying of the polymer electrolyte solution.

The membrane electrode assembly of the present invention and the polymer electrolyte fuel cell of the present invention include the electrolyte membrane of the present invention.

EXAMPLES

Hereinafter, the present invention will be more specifically described with reference to Examples, but the present invention is not limited to these examples. Various measurement conditions are as follows.
(1) Molecular Weight of Polymer The number average molecular weight and the weight average molecular weight of a polymer solution were measured by GPC. HLC-8022GPC manufactured by Tosoh Corporation was used as an ultraviolet detector-differential refractometer integrated device. Two TSKgel SuperHM-H columns (having an inner diameter of 6.0 mm and a length of 15 cm) manufactured by Tosoh Corporation were used as GPC columns. The measurement was performed with an N-methyl-2-pyrrolidone solvent (N-methyl-2-pyrrolidone solvent containing 10 mmol/L of lithium bromide) at a flow rate of 0.2 mL/min, and the number average molecular weight and the weight average molecular weight were determined in terms of standard polystyrene.
(2) Ion Exchange Capacity (IEC)

The ion exchange capacity was measured by the neutralization titration method. The measurement was performed three times, and the average of the three measurements was adopted.

An electrolyte membrane was subjected to proton exchange and thoroughly washed with pure water, and water on the membrane surface was wiped off. Then, the electrolyte membrane was vacuum-dried at 100° C. for 12 hours or more, and the dry weight of the membrane was obtained.

To the electrolyte membrane, 50 mL of a 5 mass % aqueous sodium sulfate solution was added, and the electrolyte membrane was left standing for 12 hours for ion exchange.

The generated sulfuric acid was titrated using a 0.01 mol/L aqueous sodium hydroxide solution. A commercially available 0.1 w/v % phenolphthalein solution for titration was added as an indicator, and the point at which the solution turned pale red-purple was taken as the end point.

The ion exchange capacity (IEC) was determined in accordance with the following formula.

IEC (meq/g)=[concentration (mmol/mL) of aqueous sodium hydroxide solution×dropping amount (mL) of aqueous sodium hydroxide solution]/ dry weight (g) of sample (3) Cross-Sectional SEM Measurement of Electrolyte Membrane A composite electrolyte membrane was subjected to cross-sectional SEM measurement according to the following conditions. In the obtained image, the central white area was regarded as a composite layer, and the black areas neighboring the white area were regarded as other external layers, and the thicknesses of the layers were measured.
Device: Field Emission Scanning Electron Microscope (FE-SEM) S-4800 (manufactured by Hitachi High-Technologies Corporation)

Accelerating voltage: 2.0 kV
Pretreatment: A cross-sectional sample produced by the BIB method was coated with Pt and subjected to the measurement.
BIB method: A cross-sectional sample production device based on an argon ion beam.
A shielding plate is placed directly on the sample, and the sample is irradiated with a broad ion beam of argon for etching to produce an observation surface/analysis surface (cross section).
(4) Filling Rate of Polymer Electrolyte in Composite Layer (Filling Rate in Composite Layer)

A cross section of an electrolyte membrane was observed using an SEM in accordance with the above-mentioned item (3), and the thickness T1 of the composite layer including the polymer electrolyte and the porous substrate was calculated, and when other layers were provided outside the composite layer, the thicknesses T2 and T3 of the layers were each calculated. The specific gravity of the polymer electrolyte forming the composite layer was defined as D1, the specific gravities of the polymer electrolyte forming the other layers outside the composite layer were defined as D2 and D3, and the specific gravity of the electrolyte membrane was defined as D. With the IECs of the polymers forming the layers being I1, I2, and I3, and the IEC of the electrolyte membrane being I, the filling rate Y2 (volume %) of the polymer electrolyte in the composite layer was calculated in accordance with the following formula.

$Y2=[(T1+T2+T3)\times D\times I-(T2\times D2\times I2+T3\times D3\times I3)]/(T1\times D1\times I1)\times 100$ (5) Observation of Phase-Separation Structure by Transmission Electron Microscope (TEM) Tomography A sample piece of an electrolyte membrane was immersed in a 2 mass % aqueous lead acetate solution as a staining agent, and the sample piece was left standing at 25° C. for 48 hours for staining treatment. The stained sample was taken out, embedded in an epoxy resin, and fixed by irradiation with visible light for 30 seconds. A 100-nm thin piece was cut out using an ultramicrotome at room temperature, and the cut piece was observed according to the following conditions.
Device: Field Emission Electron Microscope (HRTEM) JEM-2100F manufactured by JEOL Ltd.
Image capturing: Digital Micrograph
System: marker method
Accelerating voltage: 200 kV
Magnification: 30,000 times
Tilt angle: +61° to −62°
Reconstruction resolution: 0.71 nm/pixel
The marker method was applied to the three-dimensional reconstruction process. An alignment marker used for performing three-dimensional reconstruction was Au colloidal particles provided on a collodion film. Using the marker as a reference, the sample was tilted in 1° steps in the range of +61° to −62° and TEM images were taken. Based on a total of 124 TEM images in the obtained tilt-series TEM images, a CT reconstruction process was performed, and a three-dimensional phase-separation structure was observed.
(6) Measurement of Dimension Change Rate ($\lambda_{xy}$) by Hot Water Test An electrolyte membrane was cut into a square piece of about 5 cm×about 5 cm, left standing for 24 hours in a temperature- and humidity-controlled atmosphere having a temperature of 23° C.±5° C. and a humidity of 50±5% RH, and then the MD length and the TD length (MD1 and TD1) were measured with a caliper. The electrolyte membrane was immersed in hot water at 80° C. for 8 hours, then the MD length and the TD length (MD2 and TD2) were measured again with a caliper, and the dimension change rates of MD and TD in the plane direction ($\lambda_{MD}$ and $\lambda_{TD}$) and the dimension change rate of the electrolyte membrane in the plane direction ($\lambda_{xy}$) (%) were calculated by the following formulae.

$$\lambda_{MD} = (MD2 - MD1)/MD1 \times 100$$

$$\lambda_{TD} = (TD2 - TD1)/TD1 \times 100$$

$$\lambda_{xy} = (\lambda_{MD} + \lambda_{TD})/2$$

(7) Proton Conductivity

An electrolyte membrane was immersed in pure water at 25° C. for 24 hours, and then held in a thermostat at 80° C. and a relative humidity of 25% RH for 30 minutes, and the proton conductivity of the sample was measured by a constant potential AC impedance method. The measurement device used was an electrochemical measuring system (Solartron 1287 Electrochemical Interface and Solartron 1255B Frequency Response Analyzer) manufactured by Solartron Analytical. The constant potential impedance was measured by a two-probe method to determine the proton conductivity. The AC amplitude was 50 mV. The sample used was a membrane having a width of 10 mm and a length of 50 mm. A measurement jig was produced from a phenol resin, and was opened at the measurement part. Two platinum plates (thickness: 100 µm) were used as electrodes. The electrodes were arranged on the front and back sides of the sample membrane with a distance between the electrodes of 10 mm so as to be parallel to each other and orthogonal to the longitudinal direction of the sample membrane.

(8) Production of Membrane Electrode Assembly (MEA) Using Electrolyte Membrane

Platinum catalyst-supporting carbon particles TEC10E50E (platinum support rate: 50 mass %) manufactured by Tanaka Kikinzoku Kogyo K.K. and "Nafion" (registered trademark) manufactured by The Chemours Company were adjusted to a mass ratio of 2:1 to produce a catalyst ink. The catalyst ink was applied to a commercially available film made of polytetrafluoroethylene so that the amount of platinum might be 0.3 mg/cm² to produce a catalyst decal.

Two 5-cm square pieces were cut from the catalyst decal, and the cut pieces were stacked to face each other so as to sandwich an electrolyte membrane. Then, the resulting laminate was hot-pressed at 150° C. and 5 MPa for 3 minutes to produce a catalyst coated membrane. The resulting catalyst coated membrane was sandwiched between 5 cm square pieces cut from a commercially available gas diffusion electrode 24BCH manufactured by SGL Carbon Japan Co., Ltd., and an MEA was thus produced with one surface serving as a cathode electrode and the other surface serving as an anode electrode.

(9) Dry-Wet Cycle Durability

The MEA produced in the item (8) was set in a JARI standard cell Ex-1 (electrode area: 25 cm²) manufactured by EIWA Corporation. At a cell temperature of 80° C., a cycle of supplying 160% RH nitrogen to both the electrodes for 2 minutes and then supplying 0% RH nitrogen (dew point: −20° C. or less) to both the electrodes for 2 minutes was repeated. The hydrogen permeation amount was measured at every 1,000 cycles, and the point at which the hydrogen permeation current exceeded 10 times the initial current was defined as the dry-wet cycle durability.

The hydrogen permeation amount was measured by supplying hydrogen as a fuel gas to one electrode and nitrogen to the other electrode, and conducting the test under humidification conditions of a 90% RH hydrogen gas and a 90% RH nitrogen gas. The MEA was held until the open circuit voltage reached 0.2 V or less, the voltage was swept from 0.2 to 0.7 V at 1 mV/sec, and the current value at 0.7 V was taken as the hydrogen permeation current.

(10) Measurement of Fluorine Atom Content in Porous Substrate

A porous substrate sample was weighed and burned in a combustion tube of an analyzer according to the following conditions, the generated gas was made to be absorbed in a solution, and part of the liquid having absorbed the gas was analyzed by ion chromatography.

<Combustion/Absorption Conditions>

System: AQF-2100H and GA-210 (manufactured by Mitsubishi Chemical Corporation)

Temperature of electric furnace: 900° C. at the inlet and 1,000° C. at the outlet Gas: Ar/O₂, 200 mL/min; O₂, 400 mL/min Absorption liquid: $H_2O_2$ 0.1%, internal standard Br 8 µg/mL Volume of absorption liquid: 20 mL <Ion Chromatography/Anion Analysis Conditions>

System: ICS1600 (manufactured by Dionex)

Mobile phase: 2.7 mmol/L $Na_2CO_3$/0.3 mmol/L $NaHCO_3$

Flow rate: 1.50 mL/min

Detector: electrical conductivity detector

Injection volume: 20 µL

(11) Chemical Structure Analysis of Surfactants

Chemical structures of various surfactants were analyzed by infrared spectroscopy (IR), $^1H$ nuclear magnetic resonance (NMR) analysis, $^{19}F$ NMR analysis, MALDI-MS analysis, and pyrolysis GC/MS analysis, and the contents of fluorine atoms and hydrophilic elements (total of oxygen, nitrogen, phosphorus, sulfur, and boron) were calculated.

(12) Measurement of Weight Average Molecular Weight of Surfactant

The weight average molecular weight of a surfactant was measured by gel permeation chromatography (GPC) analysis according to the following conditions.

Device: Gel Permeation Chromatograph GPC (Instrument No. GPC-27)

Detector: UV-visible absorption spectrophotometer UV (SPD-20AV manufactured by Shimadzu Corporation)

Column: TSKgel SuperHZM-N (two pieces)

SuperHZ4000, 2500, and 1000 (one piece each)

Solvent: tetrahydrofuran (TIF)

Flow rate: 0.45 mL/min

Column temperature: 40° C.

Injection volume: 0.02 mL

Standard sample: monodisperse polyethylene glycol (PEG) manufactured by Tosoh Corporation and Agilent Technologies Japan, Ltd.

Data processing: GPC data processing system manufactured by Toray Research Center, Inc.

(13) Amount of Surfactant Contained in Electrolyte Membrane

An electrolyte membrane was weighed and burned in a combustion tube of an analyzer according to the following conditions, the generated gas was made to be absorbed in a solution, and part of the liquid having the gas absorbed therein was analyzed by ion chromatography. The contribution of the surfactant was calculated by excluding, from the analysis value, the contribution of the polymer electrolyte that does not contain the surfactant measured in advance and the contribution of the porous substrate measured in advance in the item (10), the amount of the surfactant contained in the composite electrolyte membrane was calculated from the amount of fluorine atoms included in the surfactant, and the ratio of the surfactant to the polymer electrolyte contained in the composite membrane (surfactant/polymer electrolyte) was determined.

<Combustion/Absorption Conditions>

System: AQF-2100H and GA-210 (manufactured by Mitsubishi Chemical Corporation)

Temperature of electric furnace: 900° C. at the inlet and 1,000° C. at the outlet Gas: $Ar/O_2$, 200 mL/min; $O_2$, 400 mL/min Absorption liquid: $H_2O_2$ 0.1%, internal standard Br 8 μg/mL Volume of absorption liquid: 20 mL <Ion Chromatography/Anion Analysis Conditions>

System: ICS1600 (manufactured by Dionex)

Mobile phase: 2.7 mmol/L $Na_2CO_3$/0.3 mmol/L $NaHCO_3$

Flow rate: 1.50 mL/min

Detector: electrical conductivity detector

Injection volume: 20 μL

(14) Measurement of Oxygen Content of Porous Substrate by XPS

A porous substrate cut into a 5-mm square piece in advance was rinsed with ultrapure water, dried at room temperature at 67 Pa for 10 hours, cooled with liquid nitrogen for 30 minutes, and subjected to treatment with a freezer mill for 5 minutes twice to prepare a sample. The composition of the prepared sample was measured, and the oxygen atom content of the sample was calculated. The measurement device and conditions are as follows.

Measurement device: Quantera SXM

Excited X-ray: monochromatic Al K $α_1$, K $α_2$ ray (1486.6 eV)

X-ray diameter: 200 μm

Photoelectron take-off angle: 45°

(15) Measurement of Mechanical Characteristics of Electrolyte Membrane in Dry State An electrolyte membrane as a specimen was set in a device, and subjected to a tensile test under the below-mentioned conditions. The values taken as tensile strength and tensile elongation were the values measured at the instant when the maximum point stress was exhibited in the test. The value of elastic modulus was the value determined so as to be the maximum, as calculated using arbitrary two points at which the distortion was 0.35%. In cases where a tensile modulus (N/cm) per width was calculated, a value obtained by dividing a force (N) outputted in the tensile test by a membrane width (cm) was regarded as a strength (N/cm), and a value obtained by further dividing the difference in the strength (N/cm) between the above-mentioned two points by the distortion of 0.0035 (dimensionless quantity) was regarded as a tensile modulus (N/cm) per width. In cases where a tensile modulus (MPa) per cross-sectional area was calculated, a value obtained by dividing a force (N) outputted in the tensile test by the cross-sectional area ($mm^2$) of a membrane, that is, the product of the membrane width (mm) and the membrane thickness (mm), was regarded as a stress (MPa), and a value obtained by further dividing the difference in the stress (MPa) between the above-mentioned two points by the distortion of 0.0035 (dimensionless quantity) was regarded a tensile modulus (MPa) per cross-sectional area. The maximum point stress and the elastic modulus were each calculated as the average value taken from five tests.

Measurement device: Autograph AG-IS (manufactured by Shimadzu Corporation)

Load range: 100N

Tension rate: 100 mm/min

Test piece: 10 mm wide×50 mm long

Distance between samples: 30 mm

Test temperature and humidity: 23±1° C., 60±10% RH

Number of tests: n=5

(16) Measurement of Mechanical Characteristics of Electrolyte Membrane in Wet State An electrolyte membrane as a specimen was cut into a test piece size in advance, immersed in ultrapure water at 23° C. for 24 hours, and subjected to a tensile test under the same conditions and by the same method as in (15), and then, the tensile strength, tensile elongation, and elastic modulus were calculated.

(17) Measurement of Haze and Diffuse Transmittance

An electrolyte membrane as a specimen having a 5 cm×5 cm size was cut out, and subjected to haze measurement under the below-mentioned conditions. In the haze measurement, a total light irradiation amount $T_1$ and a device scattering rate $T_3$ were determined without any sample in advance, and a total light transmittance $T_2$ and a sample scattering rate $T_4$ were measured with a sample set. Then, a diffuse transmittance $T_d$ and a haze value were calculated.

Measurement device: haze meter HGM-20P (manufactured by Suga Test Instruments Co., Ltd.)

(18) SEM Observation of Porous Substrate

A porous substrate as a specimen having a 2 mm×2 mm size was cut out, subjected to platinum ion sputtering, and then observed by SEM so that the form of the porous substrate in the plane direction was observed. The orientation of the nodes and fibrils contained in the porous substrate was determined on the basis of the structure observed by SEM in a freely selected 15 μm×15 μm range. The average diameter of the nodes and the average diameter of the fibrils were each calculated by measuring the diameter of each of the nodes and the fibrils, 100 points each, in a freely selected 15 μm×15 μm range, and then calculating the average value. The ion sputtering and the SEM observation were performed using the below-mentioned device and conditions.

<Ion Sputtering>

Sputtering device: ion sputter E-1045 (manufactured by Hitachi High-Technologies Corporation)

Metal species: Pt

Ion emission current: 15 mA

Sputtering time: 60 seconds

<SEM Observation>

Measurement device: scanning electron microscope S-5500 (manufactured by Hitachi High-Technologies Corporation)

Accelerating voltage: 5 kV

Observation magnification: 2,000 to 20,000 times

Synthesis Example 1

Synthesis of 2,2-bis(4-hydroxyphenyl)-1,3-dioxolane (K-DHBP) Represented by the Following Chemical Formula (G1)

In a 500-mL flask equipped with a stirrer, a thermometer, and a distillation tube, 49.5 g of 4,4'-dihydroxybenzophenone, 134 g of ethylene glycol, 96.9 g of trimethyl orthoformate, and 0.50 g of p-toluenesulfonic acid monohydrate were charged and dissolved. Then, the contents were kept warm and stirred at 78 to 82° C. for 2 hours. Further, the internal temperature was gradually raised to 120° C., and the contents were heated until the distillation of methyl formate, methanol, and trimethyl orthoformate completely stopped. After the reaction liquid was cooled to room temperature, the reaction liquid was diluted with ethyl acetate, the organic layer was washed with 100 mL of a 5% aqueous potassium carbonate solution, the resulting liquid was separated, and the solvent was distilled away. To the residue, 80 mL of dichloromethane was added to deposit crystals, and the crystals were filtered and dried to give 52.0 g of 2,2-bis(4-hydroxyphenyl)-1,3-dioxolane represented by the following chemical formula (G1). The crystals were analyzed by GC, and it was found that the crystals were 99.9% of 2,2-bis(4-hydroxyphenyl)-1,3-dioxolane and 0.1% of 4,4'-dihydroxy-benzophenone.

[Chemical Formula 5]

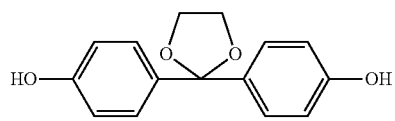

(G1)

Synthesis Example 2

Synthesis of disodium-3,3'-disulfonate-4,4'-difluorobenzophenone Represented by the Following Chemical Formula (G2)

In 150 mL of fuming sulfuric acid (50% $SO_3$) (a reagent from Fujifilm Wako Pure Chemical Corporation), 109.1 g of 4,4'-difluorobenzophenone (a reagent from Sigma-Aldrich Japan LLC) was reacted at 100° C. for 10 hours. Then, the resulting product was gradually poured into a large amount of water, the resulting mixture was neutralized with NaOH, and then 200 g of sodium chloride (NaCl) was added to the mixture to precipitate a synthesized product. The obtained precipitate was filtered off and recrystallized from an aqueous ethanol solution to give the disodium-3,3'-disulfonate-4,4'-difluorobenzophenone represented by the below-mentioned chemical formula (G2). The compound had a purity of 99.3%.

[Chemical Formula 6]

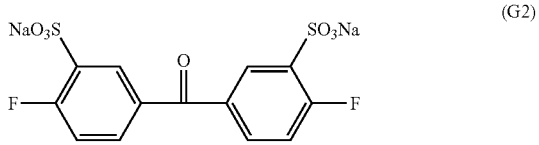

(G2)

Synthesis Example 3

Synthesis of Ionic Group-Free Oligomer a1 Represented by the Following General Formula (G3)

In a 1,000-mL three-necked flask equipped with a stirrer, a nitrogen introduction tube, and a Dean-Stark trap, 16.59 g (120 mmol) of potassium carbonate (a reagent from Sigma-Aldrich Japan LLC), 25.8 g (100 mmol) of K-DHBP obtained in Synthesis Example 1, and 20.3 g (93 mmol) of 4,4'-difluorobenzophenone (a reagent from Sigma-Aldrich Japan LLC) were added. After nitrogen substitution, 300 mL of N-methylpyrrolidone (NMP) and 100 mL of toluene were added, the resulting mixture was dehydrated at 160° C., the temperature was raised to remove toluene, and the mixture was polymerized at 180° C. for 1 hour. The resulting product was subjected to reprecipitation purification in a large amount of methanol to produce an ionic group-free oligomer (terminal: hydroxyl group). The oligomer had a number average molecular weight of 10,000.

In a 500-mL three-necked flask equipped with a stirrer, a nitrogen introduction tube, and a Dean-Stark trap, 1.1 g (8 mmol) of potassium carbonate (a reagent from Sigma-Aldrich Japan LLC) and 20.0 g (2 mmol) of the ionic group-free oligomer (terminal: hydroxyl group) were added. After nitrogen substitution, 100 mL of NMP and 30 mL of toluene were added, the resulting mixture was dehydrated at 100° C., the temperature was raised to remove toluene, 4.0 g (12 mmol) of decafluorobiphenyl (a reagent from Sigma-Aldrich Japan LLC) was added, and the resulting mixture was reacted at 105° C. for 1 hour. The resulting product was subjected to reprecipitation for purification in a large amount of isopropyl alcohol to produce an ionic group-free oligomer a1 (terminal: fluoro group) represented by the following general formula (G3). The oligomer had a number average molecular weight of 11,000.

[Chemical Formula 7]

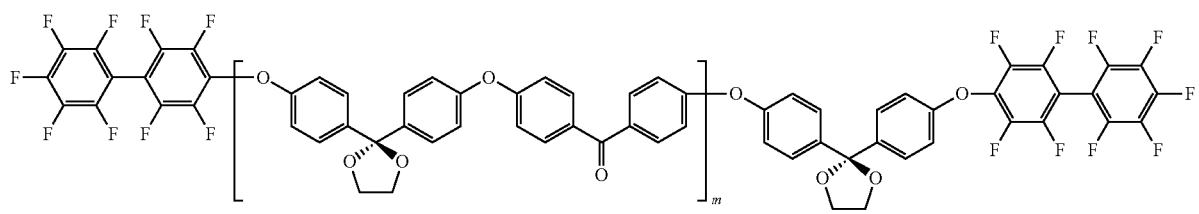

(G3)

Synthesis Example 4

Synthesis of Ionic Group-Containing Oligomer a2 Represented by the Following General Formula (G4)

In a 1,000-mL three-necked flask equipped with a stirrer, a nitrogen introduction tube, and a Dean-Stark trap, 27.6 g (200 mmol) of potassium carbonate (a reagent from Sigma-Aldrich Japan LLC), 12.9 g (50 mmol) of K-DHBP obtained in Synthesis Example 1, 9.3 g (50 mmol) of 4,4'-biphenol (a reagent from Sigma-Aldrich Japan LLC), 39.3 g (93 mmol) of disodium-3,3'-disulfonate-4,4'-difluorobenzophenone obtained in Synthesis Example 2, and 17.9 g (82 mmol) of 18-crown-6 (a reagent from Fujifilm Wako Pure Chemical Corporation) were added. After nitrogen substitution, 300 mL of NMP and 100 mL of toluene were added, the resulting mixture was dehydrated at 170° C., the temperature was raised to remove toluene, and the resulting mixture was polymerized at 180° C. for 1 hour. The resulting product was subjected to reprecipitation for purification in a large amount of isopropyl alcohol to produce an ionic group-containing oligomer a2 (terminal: hydroxyl group) represented by the following general formula (G4). The oligomer had a number average molecular weight of 16,000.

[Chemical Formula 8]

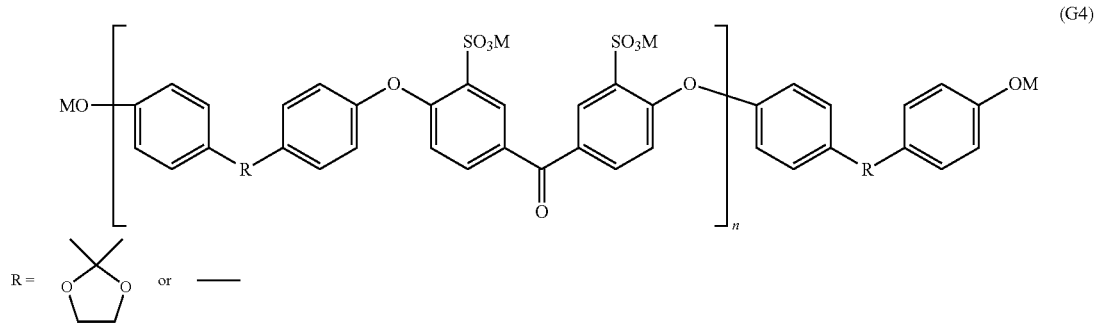

(In the general formula (G4), M represents H, Na, or K.)

Synthesis Example 5

Synthesis of neopentyl 3-(2,5-dichlorobenzoyl)benzenesulfonate Represented by the Following Chemical Formula (G5)

To a 3-L three-necked flask equipped with a stirrer and a cooling tube, 245 g (2.1 mol) of chlorosulfonic acid was added, subsequently 105 g (420 mmol) of 2,5-dichlorobenzophenone was added, and the contents were reacted in an oil bath at 100° C. for 8 hours. After a predetermined time, the reaction liquid was slowly poured into 1,000 g of crushed ice and extracted with ethyl acetate. The organic layer was washed with brine and dried over magnesium sulfate, and then ethyl acetate was distilled away to give light yellow crude crystals of 3-(2,5-dichlorobenzoyl)benzenesulfonic acid chloride. The crude crystals were used in the next step as they were without purification.

To 300 mL of pyridine, 41.1 g (462 mmol) of 2,2-dimethyl-1-propanol (neopentyl alcohol) was added, and the resulting mixture was cooled to about 10° C. The crude crystals obtained as described above were gradually added to the mixture over about 30 minutes. After all the crude crystals were added, the mixture was stirred for another 30 minutes to react. After the reaction, the reaction liquid was poured into 1,000 mL of aqueous hydrochloric acid, and the deposited solid was collected. The obtained solid was dissolved in ethyl acetate, the resulting solution was washed with an aqueous sodium hydrogen carbonate solution and brine and dried over magnesium sulfate, and ethyl acetate was distilled away to give crude crystals. The crude crystals were recrystallized from methanol to give white crystals of neopentyl 3-(2,5-dichlorobenzoyl)benzenesulfonate represented by the following chemical formula (G5).

[Chemical Formula 9]

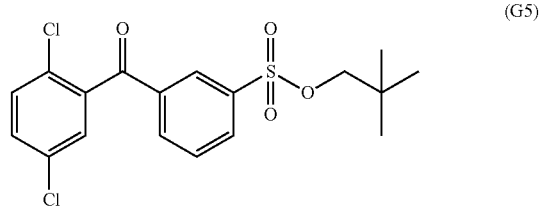

Synthesis Example 6

Synthesis of Ionic Group-Free Oligomer Represented by the Following General Formula (G6)

In a 1-L three-necked flask equipped with a stirrer, a thermometer, a cooling tube, a Dean-Stark tube, and a three-way cock for introducing nitrogen, 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate were weighed. After nitrogen substitution, 346 mL of sulfolane and 173 mL of toluene were added to the contents, and the resulting mixture was stirred. The flask was placed in an oil bath and heated to 150° C. for reflux. The water generated by the reaction was azeotropically distilled with toluene, and the reaction was continued with the water being removed to the out of the system with the Dean-Stark tube. As a result, generation of water almost ceased to be observed in about 3 hours. Most of toluene was removed with the reaction temperature being gradually raised, and then the reaction was continued at 200° C. for 3 hours. Then, 12.3 g (0.072 mol) of 2,6-dichlorobenzonitrile was added, and the reaction was performed for another 5 hours.

The obtained reaction liquid was allowed to cool, and then 100 mL of toluene was added for dilution. The by-produced inorganic compound precipitate was removed by filtration, and the filtrate was poured into 2 L of methanol. The precipitated product was filtered off, collected, dried, and then dissolved in 250 mL of tetrahydrofuran. The resulting solution was reprecipitated in 2 L of methanol to give 107 g of a target oligomer represented by the following general formula (G6). The oligomer had a number average molecular weight of 11,000.

[Chemical Formula 10]

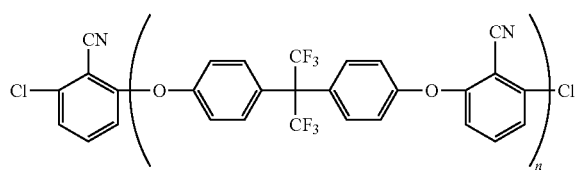

(G6)

Synthesis Example 7

Synthesis of Polyether Sulfone (PES) Block Copolymer Precursor b4' Including Segment Represented by the Following Chemical Formula (G8) and Segment Represented by the Following General Formula (G9)

First, 1.62 g of anhydrous nickel chloride and 15 mL of dimethyl sulfoxide were mixed, and the mixture was adjusted to 70° C. To the mixture, 2.15 g of 2,2'-bipyridyl was added, and the resulting mixture was stirred at the same temperature for 10 minutes to prepare a nickel-containing solution.

In 5 mL of dimethyl sulfoxide, 1.49 g of (2,2-dimethylpropyl)2,5-dichlorobenzenesulfonate and 0.50 g of SUMIKA EXCEL PES5200P (manufactured by Sumitomo Chemical Company, Limited, Mn=40,000, Mw=94,000) represented by the following general formula (G7) were dissolved, 1.23 g of a zinc powder was added to the resulting solution, and the resulting mixture was adjusted to 70° C. The nickel-containing solution was poured into the solution, and a polymerization reaction was performed at 70° C. for 4 hours. The reaction mixture was added to 60 mL of methanol, then 60 mL of 6 mol/L hydrochloric acid was added to the mixture, and the mixture was stirred for 1 hour. The deposited solid was separated by filtration and dried to give 1.62 g of an off-white block copolymer precursor b4' including the segments represented by the following chemical formula (G8) and the following general formula (G9) in a yield of 99%. The block copolymer precursor had a weight average molecular weight of 230,000.

[Chemical Formula 11]

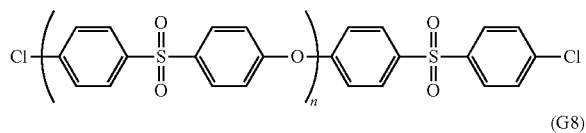

(G7)

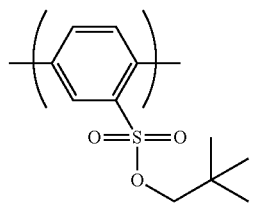

(G8)

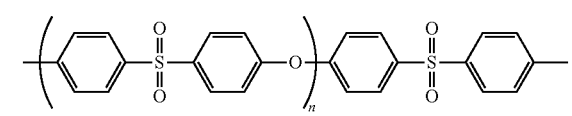

(G9)

Synthesis Example 8

Synthesis of Polybenzimidazole (PBI)

In a nitrogen atmosphere, polyphosphoric acid (PAA) was used as a polymerization solvent, 22.7 g (106 mol) of 3,3'-diaminobenzidine (DAB) and 27.3 g (106 mol) of 4,4'-oxybisbenzoic acid (OBBA) were weighed out and added to the PAA so as to become 3 mass %, and the resulting mixture was gradually heated with stirring, and stirred at 140° C. for 12 hours to undergo polycondensation. After reaction, the resulting solution was cooled to room temperature, poured into ion-exchanged water to be solidified, and neutralized with an aqueous sodium hydroxide solution. The resulting solution was filtered, washed with ion-exchanged water, and then dried under reduced pressure at 80° C. overnight to obtain target polybenzimidazole. The polybenzimidazole had a weight average molecular weight of 430,000.

[Polymer Electrolyte Solution A] Polymer Electrolyte Solution Containing Block Copolymer b1 Obtained by Copolymerizing the Following: An Oligomer Represented by the General Formula (G4) as an Ionic Group-Containing Segment; and an Oligomer Represented by the General Formula (G3) as an Ionic Group-Free Segment In a 500-mL three-necked flask equipped with a stirrer, a nitrogen introduction tube, and a Dean-Stark trap, 0.56 g (4 mmol) of potassium carbonate (a reagent from Sigma- Aldrich Japan LLC) and 16 g (1 mmol) of the ionic group-containing oligomer a2 (terminal: hydroxyl group) obtained in Synthesis Example 4 were added. After nitrogen substitution, 100 mL of N-methylpyrrolidone (NMP) and 30 mL of cyclohexane were added, the resulting mixture was dehydrated at 100° C., the temperature was raised to remove cyclohexane, 11 g (1 mmol) of the ionic group-free oligomer a1 (terminal: fluoro group) obtained in Synthesis Example 3 was added, and the resulting mixture was reacted at 105° C. for 24 hours. The resulting product was subjected to reprecipitation purification in a large amount of isopropyl alcohol to produce a block copolymer b1. The block copolymer had a weight average molecular weight of 340,000. This block copolymer b1 had an ion exchange capacity (IEC) of 2.1.

A 5 mass % N-methylpyrrolidone (NMP) solution in which the obtained block copolymer b1 was dissolved, that is, a polymerization stock solution was directly centrifuged at a centrifugal force of 20,000 G at 25° C. for 30 minutes using an inverter/compact high speed refrigerated centrifuge (model number 6930) manufactured by Kubota Corporation Co., Ltd., with an angle rotor RA-800 set in the centrifuge. Since the sedimented solid matter (cake) and the supernatant liquid (coating liquid) were neatly separated, the supernatant liquid was collected. Then, the liquid was distilled under reduced pressure at 80° C. with stirring, and pressure-filtered using a 1 µm polypropylene filter to give a polymer electrolyte solution A (polymer electrolyte concentration: 13 mass %). The polymer electrolyte solution A had a viscosity of 1,300 mPa·s.

[Polymer Electrolyte Solution B] Polymer Electrolyte Solution Containing Block Copolymer b2 Obtained by Copolymerizing the Following: An Oligomer Represented by the General Formula (G4) as an Ionic Group-Containing Segment; and an Oligomer Represented by the General Formula (G3) as an Ionic Group-Free Segment A block copolymer b2 was synthesized in the same manner as the block copolymer b1 except that the amount of the ionic group-containing oligomer a2 obtained in Synthesis Example 4 was 20 g (1.25 mmol). This block copolymer b2 had a weight average molecular weight of 370,000 and an ion exchange capacity (IEC) of 2.4. In addition, the polymer electrolyte solution B had a viscosity of 1,600 mPa·s, wherein the polymer electrolyte solution B was obtained in the same manner as the polymer electrolyte solution A except that the block copolymer b2 was used instead of the block copolymer b1.

[Polymer Electrolyte Solution C] Polymer Electrolyte Solution Containing Block Copolymer b3 Obtained by Copolymerizing the Following: An Oligomer Represented by the General Formula (G4) as an Ionic Group-Containing Segment; and an Oligomer Represented by the General Formula (G3) as an Ionic Group-Free Segment A block copolymer b3 was synthesized in the same manner as the polymer electrolyte solution A except that the amount of the ionic group-containing oligomer a2 obtained in Synthesis Example 4 was 25.6 g (1.6 mmol). This block copolymer b3 had a weight average molecular weight of 390,000 and an ion exchange capacity (IEC) of 2.7. In addition, the polymer electrolyte solution C had a viscosity of 1,800 mPa·s, wherein the polymer electrolyte solution C was obtained in the same manner as the polymer electrolyte solution A except that the block copolymer b3 was used instead of the block copolymer b1.

[Polymer Electrolyte Solution D] Polymer Electrolyte Solution D Containing Random Copolymer In a 5-L reaction vessel equipped with a stirrer, a nitrogen introduction tube, and a Dean-Stark trap, 129 g of 2,2-bis (4-hydroxyphenyl)-1,3-dioxolane synthesized in Synthesis Example 1, 93 g of 4,4'-biphenol (a reagent from Sigma-Aldrich Japan LLC), and 422 g (1.0 mol) of disodium-3,3'-disulfonate-4,4'-difluorobenzophenone synthesized in Synthesis Example 2 were added. After nitrogen substitution, 3,000 g of N-methyl-2-pyrrolidone (NMP), 450 g of toluene, and 232 g of 18-crown-6 (a reagent from Fujifilm Wako Pure Chemical Corporation) were added. After it was verified that all the monomers were dissolved, 304 g of potassium carbonate (a reagent from Sigma-Aldrich Japan LLC) was added to the solution, and the resulting solution was dehydrated at 160° C. with refluxing, then the temperature was raised to remove toluene, and desalting polycondensation was performed at 200° C. for 1 hour. This random copolymer had a weight average molecular weight of 320,000 and an ion exchange capacity (IEC) of 2.1.

Then, the polymerization stock solution was diluted by the addition of NMP so that the solution might have a viscosity of 500 mPa·s, and was directly centrifuged at a centrifugal force of 20,000 G at 25° C. for 30 minutes using an inverter/compact high speed refrigerated centrifuge (model number 6930) manufactured by Kubota Corporation Co., Ltd., with an angle rotor RA-800 set in the centrifuge. Since the sedimented solid matter (cake) and the supernatant liquid (coating liquid) were neatly separated, the supernatant liquid was collected. Then, the liquid was distilled under reduced pressure at 80° C. with stirring to remove NMP until the polymer concentration reached 14 mass %, and pressure-filtered using a 5 µm polyethylene filter to give a polymer electrolyte solution D. This polymer electrolyte solution D had a viscosity of 1,000 mPa·s.

[Polymer Electrolyte Solution E] Polymer Electrolyte Solution Containing Polyarylene Block Copolymer Represented by the Following General Formula (G10)

To a mixture of 135.0 g (0.336 mol) of neopentyl 3-(2, 5-dichlorobenzoyl)benzenesulfonate, 40.7 g (5.6 mmol) of the ionic group-free oligomer represented by the general formula (G6) and synthesized in Synthesis Example 6, 6.71 g (16.8 mmol) of 2,5-dichloro-4'-(1-imidazolyl)benzophenone, 6.71 g (10.3 mmol) of bis(triphenylphosphine)nickel dichloride, 35.9 g (0.137 mol) of triphenylphosphine, 1.54 g (10.3 mmol) of sodium iodide, and 53.7 g (0.821 mol) of zinc, 540 mL of dried N,N-dimethylacetamide (DMAc) was added under nitrogen.

The reaction system was heated (finally warmed to 79° C.) with stirring and reacted for 3 hours. An increase in the viscosity of the system was observed during the reaction. The polymerization reaction solution was diluted with 730 mL of DMAc, stirred for 30 minutes, and filtered using Celite as a filter aid.

The filtrate was concentrated with an evaporator, 43.8 g (0.505 mol) of lithium bromide was added to the filtrate, and the resulting mixture was reacted at an internal temperature of 110° C. for 7 hours in a nitrogen atmosphere. After the reaction, the mixture was cooled to room temperature, poured into 4 L of acetone, and solidified. The solidified product was collected by filtration, air-dried, pulverized with a mixer, and washed with 1,500 mL of 1 N hydrochloric acid with stirring. After filtration, the product was washed with ion-exchanged water until the washing liquid came to have a pH of 5 or more, and then dried at 80° C. overnight to give 23.0 g of a target polyarylene block copolymer. After this deprotection, the polyarylene block copolymer had a weight average molecular weight of 190,000 and an ion exchange capacity (IEC) of 2.0. The obtained polyarylene block copolymer was dissolved in an N-methyl-2-pyrrolidone/methanol=30/70 (mass %) organic solvent so that the resulting solution might have a concentration of 0.1 g/g to give a polymer electrolyte solution E. The polymer electrolyte solution E had a viscosity of 1,200 mPa·s.

[Chemical Formula 12]

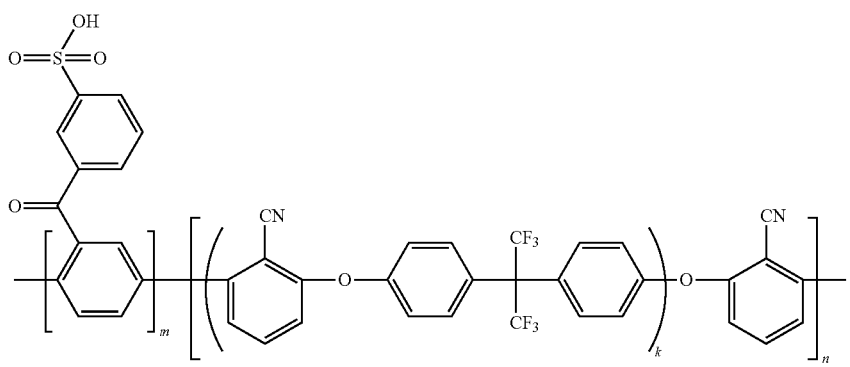

[Polymer Electrolyte Solution F] Polymer Electrolyte Solution F Containing Polyether Sulfone Block Copolymer The block copolymer precursor b4' obtained in Synthesis Example 7 was weighed out in an amount of 0.23 g and added to a mixed solution of 0.16 g of lithium bromide monohydrate and 8 mL of NMP, and the resulting mixture was reacted at 120° C. for 24 hours. The reaction mixture was poured into 80 mL of 6 mol/L hydrochloric acid and stirred for 1 hour. The deposited solid was separated by filtration. The separated solid was dried to give an off-white block copolymer b4 including the segment represented by the general formula (G9) and a segment represented by the following chemical formula (G11). The resulting polyether sulfone block copolymer had a weight average molecular weight of 190,000 and an ion exchange capacity (IEC) of 2.0. The obtained polyether sulfone block copolymer was dissolved in an N-methyl-2-pyrrolidone/methanol=30/70 (mass %) organic solvent so that the resulting solution might have a concentration of 0.1 g/g to give a polymer electrolyte solution F. The polymer electrolyte solution F had a viscosity of 1,300 mPa·s.

[Chemical Formula 13]

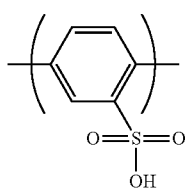

[Polytetrafluoroethylene (ePTFE) Porous substrate P1]

"POREFLON" (registered trademark) WP-010-80 (manufactured by Sumitomo Electric Fine Polymer, Inc.) was stretched 10-fold in the transverse direction, and heat-treated at 365° C. Next, the film was stretched twofold in the longitudinal directions to produce an ePTFE porous substrate P1 having a film thickness of 9 μm and a porosity of 80%. The results of the SEM observation demonstrated that the porous substrate had a structure having nodes having an average diameter of 0.9 μm and generally in parallel in the longitudinal direction and fibrils having an average diameter of 0.2 μm and generally in parallel in the transverse direction.

[Polytetrafluoroethylene (ePTFE) Porous Substrate P2]

"POREFLON" (registered trademark) HP-045-30 (manufactured by Sumitomo Electric Fine Polymer, Inc.) was biaxially stretched threefold in the longitudinal and transverse directions at once to produce an ePTFE porous substrate P2 having a film thickness of 8 μm and a porosity of 89%. The results of the SEM observation demonstrated that the porous substrate had a structure having an irregularly formed cobweb of fibrils having an average diameter of 0.3 μm.

[Hydrophilized ePTFE Porous Substrate P2']

In a glove box having a dew point of −80° C., the ePTFE porous substrate B was immersed in a solution of 30 g of a 1% metal sodium-naphthalene complex/tetrahydrofuran (THF) solution and 70 g of THF, pulled up after 3 seconds, and immediately thoroughly washed with THE to produce a hydrophilized ePTFE porous substrate P2' having a film thickness of 8 μm and a porosity of 88%.

[Porous Substrate P3 Composed of PBI Fibers]

The PBI obtained in Synthesis Example 8 was dissolved in dimethyl sulfoxide (DMSO) so as to be 8 wt %, and spun using an electrospinning unit manufactured by Kato Tech Co., Ltd. under conditions at a voltage of 20 kV, at a syringe pump discharge rate of 0.12 mL/hour, and with a distance of 100 mm between the syringe and the target to produce a nanofiber nonwoven fabric at the same time. The resulting nanofiber nonwoven fabric was dried under reduced pressure at 80° C. for 1 hour, then laminated on a "KAPTON" (registered trademark) substrate having a thickness of 125 μm, and heated in a nitrogen atmosphere at 400° C. for 10 minutes to obtain a porous substrate P3 composed of PBI fibers having an average fiber diameter of 160 nm and a thickness of 7 μm. The porous substrate had a porosity of 86%.

[Polytetrafluoroethylene (ePTFE) Porous Substrate P4]

"Tetratex" (registered trademark) TX1356 (manufactured by Donaldson Company, Inc.) was used as a porous substrate P4. The porous substrate had a film thickness of 8 μm and a porosity of 85%.

<Production of Electrolyte Membrane>

Example 1

In 100 g of the polymer electrolyte solution A, 0.26 g of a polyoxyethylene ether surfactant Ftergent (registered trademark) 208G (manufactured by NEOS Company Limited) (the fluorine atom content, 54 mass %; the hydrophilic element content, 11 mass %; the weight average molecular weight, 1,800) was dissolved to prepare an electrolyte-surfactant mixed solution having a mass ratio of the polymer electrolyte to the surfactant (hereinafter referred to as "surfactant/electrolyte") of 0.02. The electrolyte-surfactant mixed solution was applied to a glass substrate by cast coating using a knife coater, and the ePTFE porous substrate P1 was bonded to the glass substrate. The resulting laminate was held at room temperature for 1 hour to sufficiently impregnate the ePTFE porous substrate P1 with the electrolyte-surfactant mixed solution A, and then the laminate was dried at 100° C. for 4 hours. The electrolyte-surfactant mixed solution A was applied again to the upper surface of the dried membrane by cast coating, and the laminate was held at room temperature for 1 hour and then dried at 100° C. for 4 hours to produce a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give an electrolyte membrane (having a film thickness of 9 μm).

Example 2

An electrolyte membrane (having a film thickness of 9 μm) was obtained in the same manner as in Example 1 except that an electrolyte-surfactant mixed solution having a surfactant/electrolyte of 0.10 was used.

Example 3

An electrolyte membrane (having a film thickness of 9 μm) was obtained in the same manner as in Example 1 except that an electrolyte-surfactant mixed solution having a surfactant/electrolyte of 0.01 was used.

Example 4

An electrolyte membrane (having a film thickness of 9 μm) was obtained in the same manner as in Example 1 except that the polymer electrolyte solution B was used instead of the polymer electrolyte solution A.

Example 5

An electrolyte membrane (having a film thickness of 9 μm) was obtained in the same manner as in Example 1 except that the polymer electrolyte solution C was used instead of the polymer electrolyte solution A.

Example 6

An electrolyte membrane (having a film thickness of 10 μm) was obtained in the same manner as in Example 1 except that the polymer electrolyte solution D was used instead of the polymer electrolyte solution A.

Example 7

An electrolyte membrane (having a film thickness of 10 μm) was obtained in the same manner as in Example 1 except that the polymer electrolyte solution E was used instead of the polymer electrolyte solution A.

Example 8

An electrolyte membrane (having a film thickness of 10 μm) was obtained in the same manner as in Example 1 except that the polymer electrolyte solution F was used instead of the polymer electrolyte solution A.

Example 9

An electrolyte membrane (having a film thickness of 10 μm) was obtained in the same manner as in Example 1 except that a polyoxyethylene ether surfactant "Ftergent" (registered trademark) FTX-218 (manufactured by NEOS Company Limited) (the fluorine atom content, 46 mass %; the hydrophilic element content, 14 mass %; the weight average molecular weight, 1,900) was used instead of "Ftergent" (registered trademark) 208G.

Example 10

An electrolyte membrane (having a film thickness of 10 μm) was obtained in the same manner as in Example 1 except that a low metal content grade polyoxyethylene ether surfactant "Ftergent" (registered trademark) DFX-18 (manufactured by NEOS Company Limited) (the fluorine atom content, 46 mass %; the hydrophilic element content, 14 mass %; the weight average molecular weight, 1,900) was used instead of "Ftergent" (registered trademark) 208G.

Example 11

An electrolyte membrane (having a film thickness of 10 μm) was obtained in the same manner as in Example 1 except that a fluorine group-containing hydrophilic group/lipophilic group-containing oligomer surfactant "Ftergent" (registered trademark) 710FS (manufactured by NEOS Company Limited) (the fluorine atom content, 16 mass %; the hydrophilic element content, 30 mass %; the weight average molecular weight, 3,500) was used instead of "Ftergent" (registered trademark) 208G.

Example 12

An electrolyte membrane (having a film thickness of 8 μm) was obtained in the same manner as in Example 1 except that the ePTFE porous substrate P2 was used instead of the ePTFE porous substrate P1.

Example 13

An electrolyte membrane (having a film thickness of 9 μm) was obtained in the same manner as in Example 1 except that a fluorine group-containing hydrophilic group/lipophilic group-containing oligomer surfactant "MEGAFACE" (registered trademark) F-555 (manufactured by DIC Corporation) was used instead of "Ftergent" (registered trademark) 208G.

Example 14

The polymer electrolyte solution A was applied to a glass substrate by cast coating using a knife coater, and the PBI porous substrate P3 was bonded to the glass substrate. The resulting laminate was held at room temperature for 1 hour to sufficiently impregnate the PBI porous substrate P3 with the polymer electrolyte solution A, and then the laminate was dried at 100° C. for 4 hours. The polymer electrolyte solution A was applied again to the upper surface of the dried membrane by cast coating, and the laminate was held at room temperature for 1 hour and then dried at 100° C. for 4 hours to produce a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give an electrolyte membrane (having a film thickness of 8 μm).

Example 15

An electrolyte membrane (having a film thickness of 9 μm) was obtained in the same manner as in Example 1 except that the ePTFE porous substrate P4 was used instead of the ePTFE porous substrate P1.

Comparative Example 1

Using a knife coater, 100 g of the polymer electrolyte solution A was applied to a glass substrate by cast coating, and then, the laminate was dried at 100° C. for 4 hours to obtain a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give an electrolyte membrane (having a film thickness of 10 μm).

Comparative Example 2

An attempt was made to produce an electrolyte membrane in the same manner as in Example 1 except that "Ftergent" (registered trademark) 208G was not used, but the polymer electrolyte solution A did not penetrate into the porous substrate, and no electrolyte membrane was obtained.

Comparative Example 3

An electrolyte membrane (having a film thickness of 10 μm) was obtained in the same manner as in Comparative Example 1 except that the polymer electrolyte solution B was used instead of the polymer electrolyte solution A.

Comparative Example 4

An electrolyte membrane (having a film thickness of 10 μm) was obtained in the same manner as in Comparative Example 1 except that the polymer electrolyte solution C was used instead of the polymer electrolyte solution A.

Comparative Example 5

An electrolyte membrane (having a film thickness of 8 μm) was obtained in the same manner as in Example 5 except that the ePTFE porous substrate P2 was used instead of the ePTFE porous substrate P1.

Comparative Example 6

An electrolyte membrane (having a film thickness of 10 μm) was obtained in the same manner as in Comparative Example 1 except that the polymer electrolyte solution D was used instead of the polymer electrolyte solution A.

Comparative Example 7

An electrolyte membrane (having a film thickness of 10 μm) was obtained in the same manner as in Comparative Example 1 except that the polymer electrolyte solution E was used instead of the polymer electrolyte solution A.

Comparative Example 8

A composite electrolyte membrane (having a film thickness of 10 μm) was obtained in the same manner as in Comparative Example 1 except that the polymer electrolyte solution F was used instead of the polymer electrolyte solution A.

Comparative Example 9

An electrolyte membrane (having a film thickness of 10 μm) was obtained in the same manner as in Comparative Example 2 except that the hydrophilized ePTFE porous substrate P2' was used instead of the ePTFE porous substrate P1.

Comparative Example 10

An attempt was made to produce an electrolyte membrane in the same manner as in Example 1 except that a surfactant "Triton" (registered trademark) X-100 (a non-fluorinated surfactant) (the fluorine atom content, 0; the hydrophilic element content, 27 mass %; the weight average molecular weight, 700) was used instead of "Ftergent" (registered trademark) 208G, but the polymer electrolyte solution A did not penetrate into the porous substrate, and no electrolyte membrane was obtained.

Comparative Example 11

An electrolyte membrane (having a film thickness of 10 μm) was obtained in the same manner as in Example 1 except that a surfactant perfluorooctanesulfonic acid (PFOS) (anionic fluorinated surfactant) (the fluorine atom content, 65 mass %; the hydrophilic element content, 16 mass %; the weight average molecular weight, 500) was used instead of "Ftergent" (registered trademark) 208G.

The electrolyte membranes produced in Examples 1 to 12, Comparative Example 1, Comparative Examples 3 to 9, and Comparative Example 11 were evaluated for the ion exchange capacity (IEC), filling rate of the polymer electrolyte in the composite layer, dimension change rate $\lambda_{xy}$, proton conductivity, mechanical characteristics in a dry state, mechanical characteristics in a wet state, haze, diffuse transmittance, and dry-wet cycle durability. In addition, the ionic group-containing polymer film that constitutes the electrolyte membrane was evaluated for the presence or absence of a phase-separation structure, and the porous substrate that constitutes the electrolyte membrane was evaluated for the fluorine atom content, oxygen atom content, and the porosity. The evaluation results are shown in Table 1 and Table 2. Moreover, as for the dry-wet cycle durability, when the hydrogen permeation current did not exceed 10 times the initial current even after 20,000 cycles, the evaluation was terminated at 20,000 cycles.

TABLE 1

| | Solution for Impregnation | | | Porous Substrate | | | |
|---|---|---|---|---|---|---|---|
| | Type of Polymer Electrolyte[Note 1] | Surfactant | Surfactant/Polymer Electrolyte (mass ratio) | Type[Note 2] | Fluorine Atom Content (%) | Oxygen Atom Content (%) | Porosity (%) |
| Example 1 | Polymer Electrolyte A | "FTERGENT" (Registered Trademark) 208G | 0.02 | Porous Substrate P1 | 76 | 0 | 80 |
| Example 2 | Polymer Electrolyte A | "FTERGENT" (Registered Trademark )208G | 0.10 | Porous Substrate P1 | 76 | 0 | 80 |
| Example 3 | Polymer Electrolyte A | "FTERGENT" (Registered Trademark) 208G | 0.01 | Porous Substrate P1 | 76 | 0 | 80 |
| Example 4 | Polymer Electrolyte B | "FTERGENT" (Registered Trademark) 208G | 0.02 | Porous Substrate P1 | 76 | 0 | 80 |
| Example 5 | Polymer Electrolyte C | "FTERGENT" (Registered Trademark) 208G | 0.02 | Porous Substrate P1 | 76 | 0 | 80 |
| Example 6 | Polymer Electrolyte D | "FTERGENT" (Registered Trademark) 208G | 0.02 | Porous Substrate P1 | 76 | 0 | 80 |
| Example 7 | Polymer Electrolyte E | "FTERGENT" (Registered Trademark) 208G | 0.02 | Porous Substrate P1 | 76 | 0 | 80 |
| Example 8 | Polymer Electrolyte F | "FTERGENT" (Registered Trademark) 208G | 0.02 | Porous Substrate P1 | 76 | 0 | 80 |
| Example 9 | Polymer Electrolyte A | "FTERGENT"(Registered Trademark)FTX-218 | 0.02 | Porous Substrate P1 | 76 | 0 | 80 |
| Example 10 | Polymer Electrolyte A | "FTERGENT" (Registered Trademark) DFX-18 | 0.02 | Porous Substrate P1 | 76 | 0 | 80 |
| Example 11 | Polymer Electrolyte A | "FTERGENT" (Registered Trademark) 710FS | 0.02 | Porous Substrate P1 | 76 | 0 | 80 |
| Example 12 | Polymer Electrolyte A | "FTERGENT" (Registered Trademark) 208G | 0.02 | Porous Substrate P2 | 76 | 0 | 89 |
| Example 13 | Polymer Electrolyte A | "MEGAFACE" (Registered Trademark) F-555 | 0.08 | Porous Substrate P1 | 76 | 0 | 80 |
| Example 14 | Polymer Electrolyte A | — | — | Porous Substrate P3 | 0 | 0 | 86 |
| Example 15 | Polymer Electrolyte A | "FTERGENT" (Registered Trademark) 208G | 0.02 | Porous Substrate P4 | — | — | 85 |
| Comparative Example 1 | Polymer Electrolyte A | — | — | — | — | — | — |
| Comparative Example 2 | Polymer Electrolyte A | — | — | Porous Substrate P1 | 76 | 0 | 80 |
| Comparative Example 3 | Polymer Electrolyte B | — | — | — | — | — | — |
| Comparative Example 4 | Polymer Electrolyte C | — | — | — | — | — | — |
| Comparative Example 5 | Polymer Electrolyte C | "FTERGENT" (Registered Trademark) 208G | 0.02 | Porous Substrate P2 | 76 | 0 | 89 |
| Comparative Example 6 | Polymer Electrolyte D | — | — | — | — | — | — |
| Comparative Example 7 | Polymer Electrolyte E | — | — | — | — | — | — |
| Comparative Example 8 | Polymer Electrolyte F | — | — | — | — | — | — |
| Comparative Example 9 | Polymer Electrolyte A | — | — | Porous Substrate P2' | 59 | 17 | 88 |
| Comparative Example 10 | Polymer Electrolyte A | "TRITON" (Registered Trademark) X-100 | 0.02 | Porous Substrate P1 | 76 | 0 | 80 |
| Comparative Example 11 | Polymer Electrolyte A | PFOS | 0.02 | Porous Substrate P1 | 76 | 0 | 80 |

Note 1) polymer electrolyte A: block copolymer b1, polymer electrolyte B: block copolymer b2, polymer electrolyte C: block copolymer b3, polymer electrolyte D: random copolymer, polymer electrolyte E: polyarylene-based block copolymer, polymer electrolyte F: polyether sulfone-based block copolymer b4

Note 2) porous substrate P1: polytetrafluoroethylene (ePTFE) having a film thickness of 9 μm and a porosity of 80%, porous substrate P2: polytetrafluoroethylene (ePTFE) having a film thickness of 8 μm and a porosity of 89%, porous substrate P2': hydrophilized ePTFE having a film thickness of 8 μm and a porosity of 88%, porous substrate P3: polybenzimidazole (PBI) having a film thickness of 7 μm and a porosity of 86%, porous substrate P4: polytetrafluoroethylene (ePTFE) having a film thickness of 8 μm and a porosity of 85%

TABLE 2

| | | | | Composite Elecrolyte Membrane | | | | |
|---|---|---|---|---|---|---|---|---|
| | IEC (meq/g) | Membrane Thickness (μm) | Filing Rate in Composite Layer (%) | Surfactant/Polymer Electrolyte (mass ratio) (measured value) | Embodiment of Phase Separation Structure | Dimension Change Rate (%) | Proton Conductivity (mS/cm) | Tensile Test Dry Tensile Modulus per Width (N/cm) |
| Example 1 | 1.70 | 9 | 78 | 0.02 | Bicontinuous Structure | 3 | 2.4 | 135 |
| Example 2 | 1.55 | 9 | 79 | 0.099 | Bicontinuous Structure | 3 | 2.3 | 133 |
| Example 3 | 1.72 | 9 | 76 | 0.01 | Bicontinuous Structure | 4 | 2.6 | 136 |
| Example 4 | 1.93 | 9 | 78 | 0.02 | Bicontinuous Structure | 5 | 3.6 | 130 |
| Example 5 | 2.10 | 9 | 77 | 0.02 | Bicontinuous Structure | 7 | 3.7 | 125 |
| Example 6 | 1.62 | 10 | 78 | 0.02 | Absence of Phase Separation Structure | 7 | 0.5 | 141 |
| Example 7 | 1.49 | 10 | 78 | 0.02 | Lamellar Structure | 5 | 0.8 | 290 |
| Example 8 | 1.33 | 10 | 78 | 0.02 | Bicontinuous Structure | 3 | 0.7 | 230 |
| Example 9 | 1.68 | 10 | 77 | 0.02 | Bicontinuous Structure | 3 | 2.3 | 133 |
| Example 10 | 1.69 | 10 | 78 | 0.02 | Bicontinuous Structure | 3 | 2.4 | 134 |
| Example 11 | 1.67 | 10 | 77 | 0.02 | Bicontinuous Structure | 3 | 2.3 | 133 |
| Example 12 | 1.87 | 8 | 87 | 0.02 | Bicontinuous Structure | 4 | 2.7 | 135 |
| Example 13 | 1.59 | 9 | 79 | 0.08 | Bicontinuous Structure | 3 | 2.3 | 134 |
| Example 14 | 1.87 | 8 | 84 | — | Bicontinuous Structure | 4 | 2.7 | 138 |
| Example 15 | 1.83 | 9 | 83 | — | Bicontinuous Structure | 3 | 2.6 | 136 |
| Comparative Example 1 | 2.10 | 10 | — | — | Bicontinuous Structure | 15 | 3.1 | 190 |
| Comparative Example 2 | — | — | — | — | — | — | — | — |
| Comparative Example 3 | 2.41 | 10 | — | — | Bicontinuous Structure | 30 | 4.0 | 152 |
| Comparative Example 4 | 2.71 | 10 | — | — | Bicontinuous Structure | 40 | 4.8 | 110 |
| Comparative Example 5 | 2.37 | 8 | 86 | 0.02 | Bicontinuous Structure | 4 | 4.3 | 123 |
| Comparative Example 6 | 2.11 | 10 | — | — | Absence of Phase Separation Structure | 39 | 0.6 | 186 |
| Comparative Example 7 | 1.98 | 10 | — | — | Lamellar Structure | 25 | 1.0 | 397 |
| Comparative Example 8 | 1.99 | 10 | — | — | Bicontinuous Structure | 21 | 0.9 | 421 |
| Comparative Example 9 | 1.79 | 10 | 85 | — | Bicontinuous Structure | 6 | 2.5 | 121 |
| Comparative Example 10 | — | — | — | — | — | — | — | — |
| Comparative Example 11 | 1.69 | 9 | 78 | 0.02 | Bicontinuous Structure | 8 | 2.7 | 119 |

| | Composite Elecrolyte Membrane | | | | | | | |
|---|---|---|---|---|---|---|---|---|
| | Tensile Test | | | | | | | |
| | Wet Tensile Modulus per Width (N/cm) | Wet Tensile Modulus per Cross Sectional Area (MPa) | Wet Tensile Modulus/Dry tensile Modulus | Wet Tensile Elongation at Break (%) | Wet Tensile Strength at Break (N/cm) | Haze (%) | Diffuse Transmittance (%) | Dry-Wet Cycle Durability (times) |
| Example 1 | 50 | 550 | 0.37 | 143 | 6.1 | 42 | 37 | >20000 |
| Example 2 | 49 | 540 | 0.37 | 141 | 6.0 | 43 | 37 | >20000 |
| Example 3 | 50 | 550 | 0.37 | 144 | 6.2 | 42 | 37 | >20000 |
| Example 4 | 48 | 530 | 0.37 | 185 | 5.7 | 39 | 35 | 16000 |
| Example 5 | 45 | 498 | 0.36 | 224 | 5.1 | 38 | 34 | 12000 |
| Example 6 | 43 | 430 | 0.30 | 117 | 5.1 | 41 | 37 | 11000 |
| Example 7 | 90 | 900 | 0.31 | 131 | 5.7 | 35 | 31 | >20000 |
| Example 8 | 74 | 740 | 0.32 | 121 | 5.1 | 36 | 32 | >20000 |
| Example 9 | 49 | 540 | 0.37 | 141 | 6.1 | 42 | 37 | >20000 |
| Example 10 | 50 | 550 | 0.37 | 142 | 6.2 | 42 | 37 | >20000 |
| Example 11 | 49 | 540 | 0.37 | 141 | 6.0 | 41 | 36 | >20000 |
| Example 12 | 75 | 950 | 0.56 | 56 | 6.9 | 55 | 49 | 10000 |
| Example 13 | 49 | 540 | 0.37 | 142 | 6.0 | 43 | 37 | >20000 |
| Example 14 | 43 | 560 | 0.31 | 43 | 2.4 | 33 | 29 | 19000 |

TABLE 2-continued

| | | | | | | | | |
|---|---|---|---|---|---|---|---|---|
| Example 15 | 51 | 570 | 0.38 | 145 | 6.2 | 73 | 60 | >20000 |
| Comparative Example 1 | 27 | 270 | 0.14 | 189 | 5.3 | 0.8 | 0.7 | 2000 |
| Comparative Example 2 | — | — | — | — | — | — | — | — |
| Comparative Example 3 | 14 | 140 | 0.09 | 210 | 4.2 | 0.8 | 0.7 | 1000 |
| Comparative Example 4 | 5 | 70 | 0.05 | 235 | 3.7 | 0.9 | 0.8 | 1000 |
| Comparative Example 5 | 31 | 390 | 0.25 | 149 | 4.6 | 62 | 54 | 4000 |
| Comparative Example 6 | 12 | 120 | 0.06 | 221 | 3.9 | 0.8 | 0.7 | 1000 |
| Comparative Example 7 | 31 | 310 | 0.08 | 98 | 4.7 | 0.8 | 0.7 | 2000 |
| Comparative Example 8 | 33 | 330 | 0.08 | 89 | 4.8 | 0.8 | 0.7 | 2000 |
| Comparative Example 9 | 25 | 250 | 0.21 | 167 | 5.6 | 34 | 30 | 6000 |
| Comparative Example 10 | — | — | — | — | — | — | — | — |
| Comparative Example 11 | 20 | 220 | 0.17 | 163 | 4.8 | 41 | 37 | 5000 |

INDUSTRIAL APPLICABILITY

The electrolyte membrane of the present invention can be applied to various uses. For example, the electrolyte membrane can be applied to medical uses such as artificial skin, filtration uses, ion-exchange resin uses such as chlorine-resistant reverse osmosis membranes, various structural material uses, electrochemical uses, humidifying membranes, antifogging films, antistatic films, deoxidation films, solar battery films, and gas barrier films. Above all, the electrolyte membrane can be more preferably used in various electrochemical uses. Examples of the electrochemical uses include polymer electrolyte fuel cells, redox flow batteries, water electrolysis apparatuses, chlor-alkali electrolysis apparatuses, electrochemical hydrogen pumps, and water electrolysis hydrogen generators.

In the polymer electrolyte fuel cell, electrochemical hydrogen pump, or water electrolysis hydrogen generator, the electrolyte membrane is used in a state where a catalyst layer, an electrode substrate, and a separator are sequentially stacked on either side of the electrolyte membrane. In particular, a laminate including a catalyst layer and a gas diffusion substrate sequentially stacked on either side of the electrolyte membrane (that is, a laminate having a layer structure of gas diffusion substrate/catalyst layer/electrolyte membrane/catalyst layer/gas diffusion substrate) is referred to as a "membrane electrode assembly (MEA)". The electrolyte membrane of the present invention is suitably used as an electrolyte membrane that constitutes the CCM or MEA.

The invention claimed is:

1. A composite polymer electrolyte membrane comprising a polymer electrolyte and a porous substrate, and having a dry tensile modulus of 100 N/cm or more per width and a wet tensile modulus of 35 N/cm or more per width.

2. The composite polymer electrolyte membrane according to claim 1, having a wet tensile modulus of 400 MPa or more per cross-sectional area.

3. The composite polymer electrolyte membrane according to claim 1, having a wet tensile modulus/dry tensile modulus ratio of 0.3 or more.

4. The composite polymer electrolyte membrane according to claim 1, having a wet tensile breaking elongation of 60% or more.

5. The composite polymer electrolyte membrane according to claim 1, having a wet tensile breaking strength of 5 N/cm or more.

6. The composite polymer electrolyte membrane according to claim 1, wherein the porous substrate is a fluorinated porous substrate.

7. The composite polymer electrolyte membrane according to claim 1, wherein the oxygen atom content of the porous substrate is 10 mass % or less.

8. The composite polymer electrolyte membrane according to claim 1, wherein the polymer electrolyte is an ionic group-containing hydrocarbon polymer.

9. The composite polymer electrolyte membrane according to claim 1, further comprising a nonionic fluorinated surfactant.

10. The composite polymer electrolyte membrane according to claim 9, wherein the nonionic fluorinated surfactant is a compound having a fluorine-containing group including a fluorinated alkyl group, a fluorinated alkenyl group, or a fluorinated aryl group, and a nonionic lyophilic group.

11. The composite polymer electrolyte membrane according to claim 1, wherein the porous substrate is an aromatic hydrocarbon porous substrate.

12. The composite polymer electrolyte membrane according to claim 11, wherein the porous substrate is a polyazole-based porous substrate.

13. The composite polymer electrolyte membrane according to claim 11, wherein the porous substrate includes polybenzimidazole.

14. The composite polymer electrolyte membrane according to claim 1, having a haze value of 20% or more and 45% or less when transmitting a light beam in the thickness direction.

15. The composite polymer electrolyte membrane according to claim 1, having a diffuse transmittance of 20% or more and 40% or less when transmitting a light beam in the thickness direction.

16. A catalyst coated composite polymer electrolyte membrane comprising: the composite polymer electrolyte membrane according to claim 1; and catalyst layers, wherein the composite polymer electrolyte membrane is sandwiched between the catalyst layers.

17. A membrane electrode assembly comprising the composite polymer electrolyte membrane according to claim 1.

18. A polymer electrolyte fuel cell comprising the composite polymer electrolyte membrane according to claim 1.

* * * * *